United States Patent
Nagahori et al.

(10) Patent No.: US 8,341,140 B2
(45) Date of Patent: Dec. 25, 2012

(54) CONFIGURATION MANAGEMENT SYSTEM AND CONFIGURATION MANAGEMENT METHOD FOR STORAGE SYSTEM

(75) Inventors: Ryuji Nagahori, Tokyo (JP); Takashi Watanabe, Odawara (JP); Shiori Inoue, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 694 days.

(21) Appl. No.: 12/527,128

(22) PCT Filed: Jul. 3, 2009

(86) PCT No.: PCT/JP2009/003105
§ 371 (c)(1),
(2), (4) Date: Aug. 13, 2009

(87) PCT Pub. No.: WO2011/001476
PCT Pub. Date: Jan. 6, 2011

(65) Prior Publication Data
US 2011/0202549 A1    Aug. 18, 2011

(51) Int. Cl.
*G06F 7/00* (2006.01)
(52) U.S. Cl. .................. 707/707; 707/830
(58) Field of Classification Search .......... 705/7.11, 705/7.38, 7.39, 20, 330, 335, 11, 7.15, 1.1, 705/26.1; 707/698, 741, 747, 707, 830; 709/223; 717/151
See application file for complete search history.

(56) References Cited

U.S. PATENT DOCUMENTS

| | | | |
|---|---|---|---|
| 6,615,166 B1 * | 9/2003 | Guheen et al. | 703/27 |
| 6,954,766 B2 * | 10/2005 | Ouchi | 1/1 |
| 6,957,186 B1 * | 10/2005 | Guheen et al. | 705/323 |
| 7,165,041 B1 * | 1/2007 | Guheen et al. | 705/26.1 |
| 7,315,826 B1 * | 1/2008 | Guheen et al. | 705/7.29 |
| 7,421,691 B1 * | 9/2008 | Hancock et al. | 718/100 |
| 8,121,874 B1 * | 2/2012 | Guheen et al. | 705/7.11 |
| 2004/0107125 A1 * | 6/2004 | Guheen et al. | 705/7 |
| 2006/0143255 A1 * | 6/2006 | Shinohe et al. | 707/205 |
| 2008/0052433 A1 | 2/2008 | Harima et al. | |
| 2010/0076994 A1 * | 3/2010 | Soroca et al. | 707/769 |

FOREIGN PATENT DOCUMENTS

| | | |
|---|---|---|
| EP | 1 674 982 | 6/2006 |
| JP | 2006-178720 | 7/2006 |
| JP | 2008-233973 | 10/2008 |

OTHER PUBLICATIONS

International Search Report for International Application No. PCT/JP2009/003105 mailed Apr. 6, 2010.
Written Opinion of the International Searching Opinion for International Application No. PCT/JP2009/003105 mailed Apr. 6, 2010.

* cited by examiner

*Primary Examiner* — James Trujillo
*Assistant Examiner* — Linh Black
(74) *Attorney, Agent, or Firm* — Brundidge & Stanger, P.C.

(57) ABSTRACT

A configuration management system for a storage system including a host computer, a storage device providing a storage area for data processed by the host computer, and a communication network connecting the host computer and the storage device communicatively is disclosed. The configuration management system comprises a system condition table storing a system condition, a storage configuration table storing storage configuration information, a performance table storing a performance condition indicating a storage performance. searching the system condition table is searched using the required system condition and the performance table is searched using the required performance condition. If the storage system satisfying the required conditions fails to be extracted, content of the required system condition is changed and searching of the system condition table and the performance table is carried out.

13 Claims, 28 Drawing Sheets

STORAGE REQUIREMENT TABLE 600

| REQUIREMENT_ID (601) | DISK CAPACITY (501) | DATA LENGTH (502) | MAXIMUM RESPONSE TIME (503) | MINIMUM IOPS (504) | STORAGE PRICE (505) | STORAGE DELIVERY DATE (506) | DISPLAYED CONFIGURATION COUNT (508) |
|---|---|---|---|---|---|---|---|
| 1 | 72 GB | 2 KB | 10 ms | 10 IOPS | ¥ 1,000,000 | 20 DAYS | 20 CONFIGURATIONS |
| ... | ... | ... | ... | ... | ... | ... | ... |

Fig. 6

STORAGE REQUIREMENT TABLE 600

| REQUIREMENT_ID 601 | DISK CAPACITY 501 | DATA LENGTH 502 | MAXIMUM RESPONSE TIME 503 | MINIMUM IOPS 504 | STORAGE PRICE 505 | STORAGE DELIVERY DATE 506 | DISPLAYED CONFIGURATION COUNT 508 |
|---|---|---|---|---|---|---|---|
| 1 | 72 GB | 2 KB | 10 ms | 10 IOPS | ¥1,000,000 | 20 DAYS | 20 CONFIGURATIONS |
| ... | ... | ... | ... | ... | ... | ... | ... |

Fig. 7

| PRIORITY_ID | MAXIMUM RESPONSE TIME | MINIMUM IOPS | STORAGE PRICE | STORAGE DELIVERY DATE |
|---|---|---|---|---|
| 1 | 1 | 2 | 3 | 4 |
| ... | ... | ... | ... | ... |

PRIORITY TABLE 700

Fig. 9A

SYSTEM CONDITION TABLE 900

| COMBINATION_ID | HOST_ID | OS_ID | OS VERSION_ID | HBA_ID | DRIVER_ID | SW_ID | FIRMWARE_ID |
|---|---|---|---|---|---|---|---|
| 1 | 1 | 1 | 1 | 1 | 1 | 0 | 0 |
| 2 | 1 | 1 | 1 | 1 | 1 | 1 | 2 |
| ... | ... | ... | ... | ... | | | |

Fig. 9B

HOST TABLE 910

| HOST_ID (902) | MODEL (911) |
|---|---|
| 1 | SERVER A |
| 2 | SERVER B |
| ... | ... |

Fig. 9C

OS TABLE 920

| OS_ID (903) | MODEL (921) |
|---|---|
| 1 | OS A |
| 2 | OS B |
| ... | ... |

Fig. 9D

OS VERSION TABLE 930

| OS VERSION_ID (904) | OS VERSION (931) |
|---|---|
| 1 | ver.1 |
| 2 | ver.2 |
| ... | ... |

Fig. 9E

HBA TABLE 940

| HBA_ID 905 | MODEL 941 |
|---|---|
| 1 | HBA A |
| 2 | HBA B |
| ... | ... |

Fig. 9F

DRIVER TABLE 950

| DRIVER_ID 906 | DRIVER VERSION 951 |
|---|---|
| 1 | ver.1 |
| 2 | ver.2 |
| ... | ... |

Fig. 9G

SWITCH TABLE 960

| SWITCH_ID 907 | MODEL 961 |
|---|---|
| 1 | FCSW A |
| 2 | NWSW A |
| ... | ... |

Fig. 9H

FIRMWARE TABLE 970

| FIRMWARE_ID | FIRMWARE VERSION |
|---|---|
| 1 | ver.1 |
| 2 | ver.2 |
| ... | ... |

STORAGE CONFIGURATION TABLE 1100

| STORAGE DEVICE_ID | DEVICE MODEL | PORT TYPE | NUMBER OF PORTS | NUMBER OF PROCESSORS | CACHE CAPACITY | CONTROL PROGRAM | RAID CONFIGURATION | NUMBER OF RAID GROUPS | DISK | TOTAL CAPACITY |
|---|---|---|---|---|---|---|---|---|---|---|
| 1 | DEVICE A | FC_4GB/s | 2 | PROCESSORS × 1 | 2 GB | Ver.1 | 2D+2D | 1 | 72GB/15krpm | 142GB |
| 2 | DEVICE A | FC_4GB/s | 2 | PROCESSORS × 1 | xx GB | Ver.xx | 2D+2D | 1 | 72GB/SSD | 142GB |
| ... | ... | ... | ... | ... | ... | ... | ... | ... | ... | ... |

PERFORMANCE TABLE 1300

| PERFORMANCE_ID | COMBINATION_ID | STORAGE DEVICE_ID | DATA LENGTH | MAXIMUM RESPONSE TIME | MINIMUM IOPS |
|---|---|---|---|---|---|
| 1 | 1 | 1 | 2KB | 10 ms | 1,000 IOPS |
| 2 | 2 | 2 | 2KB | yy ms | yy IOPS |
| ... | ... | | | | ... |

1201  1202  1203  1204  1205  1206

PRICE/DELIVERY DATE TABLE 1500

| STORAGE DEVICE_ID | PRICE | DELIVERY DATE |
|---|---|---|
| 1 | ¥ 1,000,000 | 20 DAYS |
| 2 | ¥ yy | yy DAYS |
| ... | ... | ... |

1401, 1402, 1403

CONFIGURATION MANAGEMENT SYSTEM AND CONFIGURATION MANAGEMENT METHOD FOR STORAGE SYSTEM

TECHNICAL FIELD

This invention relates to a configuration management system and a configuration management method for a storage system, and particularly to a configuration management system and a configuration management method for a storage system capable of proposing various types of system configurations including the storage system combinations with the configurations approximate to those specified by the user for the conditions including the storage configuration and the storage performance required by the user.

BACKGROUND ART

A general storage system is configured of a host computer in which various types of applications are operating, a storage device providing data storage areas for the applications, a network equipment such as switches connecting the host computer and the storage device communicatively.

The vendor of the storage system unifies the components configuring the storage systems by the communication protocol (e.g. SCSI (Small Computer Serial Interface), TCP/IP (Transmission Control Protocol/Internet Protocol)) used for the communication interface among the host computer, the network equipment, and the storage device.

However, the hardware of the various types of equipment used as the components of the storage system and the algorithms of the programs controlling the input/output among the equipment (such as firmware/device driver) largely differ depending on the version and, even if the same communication protocol is used, normal input/output of data may not always be performed when the components are combined as a storage system. Furthermore, even if the combination enables data input/output, the performance as the storage system (e.g. data traffic, response time, and IOPS) may not always be maximized.

Therefore, generally when constructing a storage system, it is necessary to determine the version of the hardware of the equipment and the control programs executed in that hardware, actually connect the equipment, and examine whether the desired performance can be obtained as the storage system. For performing this examining process easily and efficiently, various types of technologies have been proposed conventionally. For example, PTL 1 discloses the technology of unifying the management of the connection configuration of the storage system by the storage device, which enables the reliability in changing part of the components to be estimated in advance. Meanwhile, PTL 2 proposes the configuration providing the user with the reliability information such as the compatibility and the stability of the components of the storage system.

CITATION LIST

Patent Literature

PTL 1: Japanese Patent Application Laid-open Publication No. 2006-178720

PTL 2: Japanese Patent Application Laid-open Publication No. 2008-233973

SUMMARY OF INVENTION

Technical Problem

However, the currently provided technologies can provide the reliability information on the already examined combinations of components but cannot be applied to the unexamined combinations of components. That is, normally, for configuring a storage system by an unexamined combination, the user or vendor is still required to actually install that configuration and examine the operation.

Furthermore, though a large number of patterns of unexamined combinations can be considered, it is difficult to appropriately decide which combination pattern is the most suitable for the examining process with reference to the conditions demanded by the user, for example, the price, the performance, and the delivery date.

Furthermore, since all the combinations which have already been examined about the reliability in data input/output do not satisfy the above-mentioned conditions, unnecessary steps might be added to the examining process if the combination satisfying the user conditions is not selected appropriately.

One of the objects of this invention is to propose various types of system configurations including the storage system combinations with the configurations approximate to those specified by the user for the conditions including the storage configuration and the storage performance required by the user.

Solution to Problem

For achieving the above-mentioned and the other objects, one aspect of this invention is the configuration management system for a storage system including a host computer, a storage device providing a storage area for data processed by the host computer, and a communication network connecting the host computer and the storage device communicatively, the configuration management system comprising a system condition storage unit storing a system condition that includes a combination of components configuring the storage system, a storage configuration storage unit storing storage configuration information that is a combination of components configuring the storage device, a performance condition storage unit storing correspondence of the system condition, the storage configuration information given to the storage device included in the storage system with the system condition, and a performance condition indicating a storage performance provided by the storage system, a configuration condition search unit, when a required system condition that is a condition required for the system condition and a required performance condition that is a condition required for the performance condition are input, searching the system condition storage unit using the required system condition and searching the performance condition storage unit using the required performance condition, and a configuration condition creation unit, if the storage system with the system condition and the performance condition satisfying the required system condition and the required performance condition fails to be extracted by the configuration condition search unit, changing content of the required system condition and searching the system condition storage unit and the performance condition storage unit.

Advantageous Effects of Invention

According to this invention, various types of system configurations including the storage system combinations with the configurations approximate to those specified by the user for the conditions including the storage configuration and the storage performance required by the user can be proposed.

BRIEF DESCRIPTION OF DRAWINGS

FIG. 6 is a diagram showing an example of a storage requirement table 600.

FIG. 7 is a diagram showing an example of a priority table 700.

FIG. 9A is a diagram showing an example of a system condition table 900.

FIG. 9B is a diagram showing an example of a host table 910.

FIG. 9C is a diagram showing an example of an OS table 920.

FIG. 9D is a diagram showing an example of the OS version table 930.

FIG. 9E is a diagram showing an example of an HBA table 940.

FIG. 9F is a diagram showing an example of a driver table 950.

FIG. 9G is a diagram showing an example of a switch table 960.

FIG. 9H is a diagram showing an example of a firmware table 970.

FIG. 11 is a diagram showing an example of a storage configuration table 1100.

FIG. 13 is a diagram showing an example of a performance table 1300.

DESCRIPTION OF EMBODIMENTS

Figure 1:
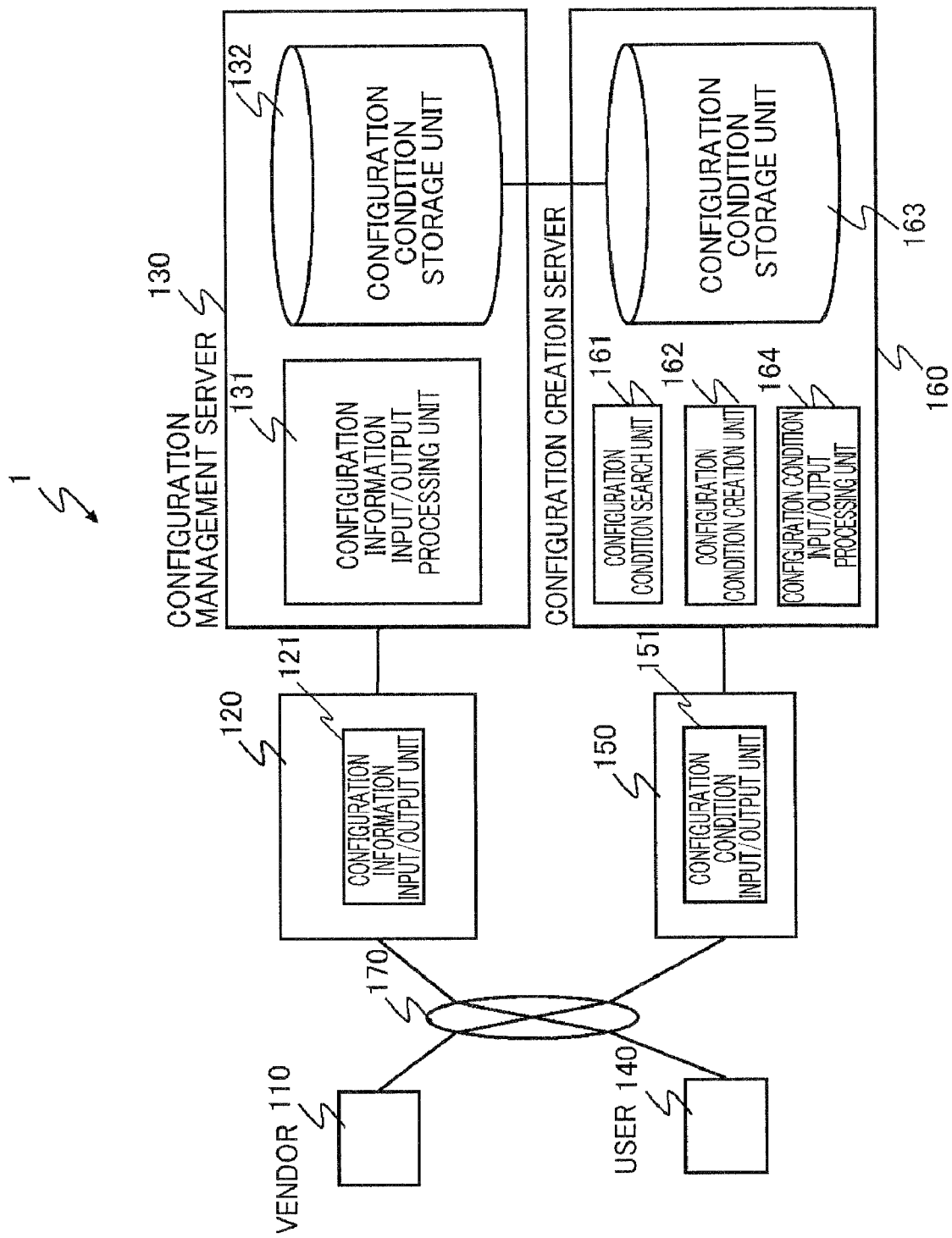
FIG. 1 is a diagram showing the configuration example of a storage configuration management system 1 according to an embodiment of this invention.

The embodiments for carrying out this invention are described below with reference to the accompanying drawings. Note that the same reference numeral is added to each of the common configurations in the accompanying drawings and the description for the same is omitted.

Configuration of Storage Configuration Management System 1 According to Present Embodiment Firstly, the configuration example of the storage configuration management system 1 according to an embodiment of this invention is described below. FIG. 1 is a diagram showing the configuration example of the storage configuration management system 1. The storage configuration management system 1 of this embodiment includes a vendor terminal 110, a vendor Web server 120, a user terminal 140, a user Web server 150, a configuration management server 130, and a configuration creation server 160. The vendor terminal 110, the user terminal 140, the vendor Web server 120, and the user Web server 150 are connected communicatively with each other via a network 170. The network 170 is a suitable communication network including, for example, LAN (Local Area Network) enabling the communication by the TCP/IP protocol or the Internet.

Figure 2:
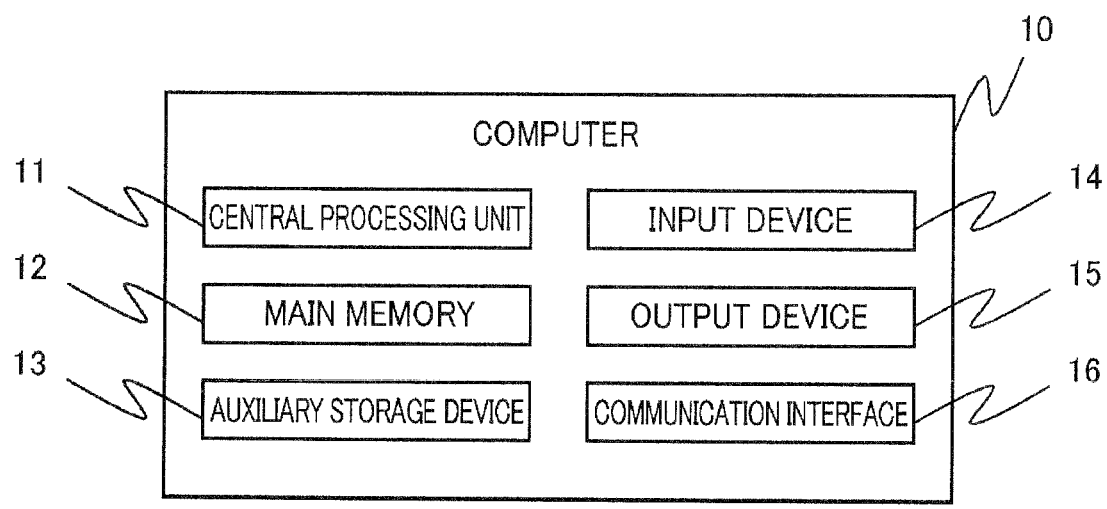
FIG. 2 is a diagram showing the configuration example of a computer 10 available as a vendor terminal 110, a user terminal 140, a vendor Web server 120, a user Web server 150, a configuration management server 130, and a configuration creation server 160 of the storage configuration management system 1.

The vendor terminal 110 is, for example, the computer including the communication interface with the network 170, and an example for the same is shown in FIG. 2. The computer 10 shown in FIG. 2 shows the configuration example of the computer available as the vendor Web server 120, the user terminal 140, the user Web server 150, the configuration management server 130, and the configuration creation server 160 as well as the vendor terminal 110 in the storage configuration management system 1.

The computer 10 includes a central processing unit 11 (e.g. a CPU or an MPU (Micro Processing Unit), hereinafter referred to as a "CPU" for simplification), a main memory 12 (e.g. a RAM (Random Access Memory) or a ROM (Read Only Memory)), an auxiliary storage device 13 (e.g. an HDD), an input device 14 accepting the user's operation input (e.g. a keyboard or a mouse), an output device 15 (e.g. a liquid crystal monitor), and a communication interface 16 for achieving the communication with the other devices (e.g. an NIC (Network Interface Card) or an HBA (Host Bus Adapter)).

The operating system (OS) operating in the computer 10 is not limited to any specific systems. For example, Windows (registered trademark) or the UNIX (registered trademark)-like operating system such as Linux (registered trademark) is preferably used as the OS.

The vendor terminal 110 is the computer installed, for example, in a place of business which is the vendor of the storage system, and used for storing the combination of the components whose operation related to the storage system is already examined and the configuration information of the storage system related to that combination such as the performance, the price and the delivery date in the configuration management server 130 to be described later. The vendor terminal 110 can be configured by installing suitable Web browser software in a PC (Personal Computer) in which, for example, Windows operates. By using this Web browser, the engineer of the vendor can perform data input/output with the configuration management server 130 via the vendor Web server 120 to be described later.

The vendor Web server 120 is connected communicatively with the configuration management server 130, and the program for achieving the configuration information input/output unit 121 for controlling the data input/output between the vendor terminal 110 and the configuration management server 130 is installed therein. The configuration information input/output unit 121 mainly executes the processing of converting the data I/O of the configuration management server 130 into the Web data to be exchanged with the vendor terminal 110, and creates the input/output interface screen to be transmitted to the vendor terminal 110. Note that the configuration of incorporating the function of the vendor terminal 110 into the vendor Web server 120 may also be employed.

The user terminal 140 is the computer installed, for example, in a place of business of the storage system user, enabling the data input/output with the configuration creation server 160 to be described later, for changing the components of the storage system used by the user or considering the configuration when newly installing a storage system. The user terminal 140, as well as the vendor terminal 110, can be configured by installing suitable Web browser software in the PC in which, for example, Windows operates. By using this Web browser, the user can perform data input/output with the configuration creation server 160 via the user Web server 150 to be described later. Note that, as mentioned above, the vendor terminal 110 is mainly used for accessing the configuration management server 130 and performing data input/output, but the vendor can also access the configuration creation server 160 as well as the user terminal 140 for performing the configuration consideration of the storage system.

The user Web server 150 is connected communicatively with the configuration creation server 160, and the program for implementing the configuration condition input/output unit 151 for controlling the data input/output between the user terminal 140 and the configuration creation server 160 is installed. The configuration condition input/output unit 151 mainly executes the processing of converting the data I/O of the configuration creation server 160 into the Web data to be exchanged with user terminal 140, and creates the input/output interface screen to be transmitted to the user terminal 140.

The configuration management server 130 includes the configuration condition storage unit 132 which is the database for storing various types of configuration information related to the storage system used by the storage configuration management system 1 of this embodiment and the configuration information input/output processing unit 131 for controlling the data input/output of the configuration condition storage unit 132.

The function of the configuration information input/output processing unit 131 is implemented by the program installed in the computer operating as the configuration management server 130. The main function of the configuration information input/output processing unit 131 includes storing the configuration information related to the storage system input from the vendor terminal 110 via the vendor Web server 120 in the configuration condition storage unit 132, reading the data required by the configuration condition storage unit 132 for the read request from the vendor terminal 110, and transmitting the data to the vendor terminal 110.

The configuration condition storage unit 132 stores the configuration information used for searching the configuration of the storage system satisfying the conditions in accordance with the conditions such as the components of the storage system and the required performance. The configuration management server 130 and the configuration creation server 160 are connected communicatively and enable mutual data transfer and data copy between the configuration condition storage units 132 and 163. The details of the configuration condition storage unit 132 are described later with the details of the configuration condition storage unit 163.

The configuration creation server 160 includes the function of searching the configuration of the storage system satisfying the conditions in response for the query from the user terminal 140 or creating the configuration of the storage system satisfying the conditions such as the performance, and also includes the configuration condition search unit 161, the configuration condition creation unit 162, the configuration condition storage unit 163, and the configuration condition input/output processing unit 164.

The configuration condition search unit 161 searches the configuration condition storage unit 163 in accordance with the search conditions related to the storage system input by the user terminal 140. The configuration condition creation unit 162 includes the function of, if the search result satisfying the search conditions fails to be obtained by the configuration condition search unit 161, creating the configuration satisfying the performance conditions and others required by the storage system from among the search conditions and returning the response to the user terminal 140. The configuration condition input/output processing unit 164 includes the function as an interface transmitting and receiving data I/O requests from the user terminal 140 to and from the configuration condition storage unit 163. The functions of the configuration condition search unit 161, the configuration condition creation unit 162, and the configuration condition input/output processing unit 164 are implemented by the program installed in the computer configuring the configuration creation server 160. The details of the configuration condition search unit 161 and the configuration condition creation unit 162 are described by referring to the following flowcharts and others.

The configuration condition storage unit 163 is the database including basically the same configuration as the configuration condition storage unit 132 installed in the configuration management server 130. The difference from the configuration condition storage unit 132 is that, while the configuration condition storage unit 132 of the configuration management server 130 stores all the combinations of the components of the storage system input by the vendor, the configuration condition storage unit 163, with reference to the performance conditions and other conditions given by the user, extracts and maintains part of the configuration information which the configuration condition storage unit 132 stores. The details of the configuration condition storage unit 163 is described later, with the processing by the configuration condition search unit 161 and the configuration condition creation unit 162.

Figure 3:
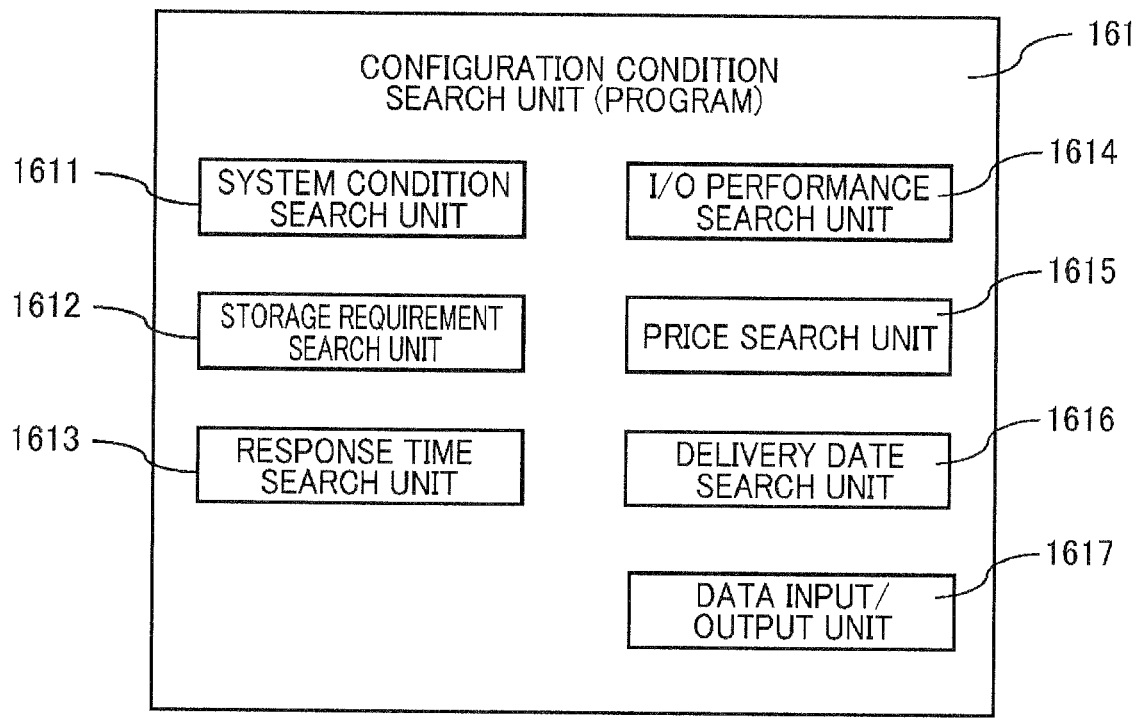
FIG. 3 is a diagram showing the configuration example of the software in a configuration condition search unit 161 of the configuration creation server 160.

Next, the configuration of the configuration condition search unit 161 is described below. As described above, the configuration condition search unit 161 has the function of searching the configuration condition storage unit 163 in accordance with the performance conditions and other conditions for the storage system input by the user terminal 140. The configuration example of the configuration condition search unit 161 in the storage configuration management system 1 of this embodiment is shown in FIG. 3. The configuration condition search unit 161 includes the system condition search unit 1611, the storage requirement search unit 1612, the response time search unit 1613, the I/O performance search unit 1614, the price search unit 1615, the delivery date search unit 1616, and the data input/output unit 1617. The system condition search unit 1611, the storage requirement search unit 1612, the response time search unit 1613, the I/O performance search unit 1614, the price search unit 1615, the delivery date search unit 1616, and the data input/output unit 1617 are the function blocks respectively included in the programs for implementing the function of the configuration condition search unit 161. The data input/output unit 1617 is the function block performing the data I/O processing between the configuration condition storage unit 163 and the user Web server 150. The details of the function blocks other than this data input/output unit 1617 are described later with reference to the processing flowcharts executed by them respectively.

Figure 4:
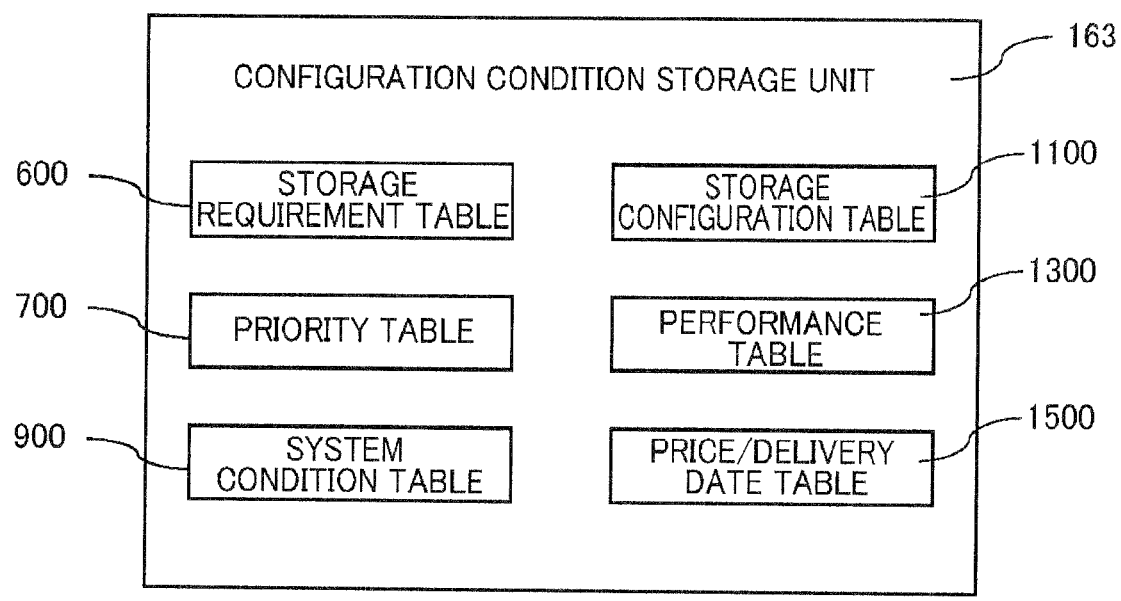
FIG. 4 is a diagram showing the configuration example of a configuration condition storage unit 132 in the configuration management server 130.

Next, the configuration condition storage unit 163 is described below. FIG. 4 shows the configuration example of the configuration condition storage unit 163. The configuration condition storage unit 163 of the storage configuration management system 1 is, as described above, the database storing the storage configuration information to be the target of the search by the configuration condition search unit 161. The configuration condition storage unit 163 includes a storage requirement table 600, a priority table 700, a system condition table 900, a storage configuration table 1100, a performance table 1300, and a price/delivery date table 1500. These tables are described below with reference to the examples of the input/output interface screens of the data stored in the respective tables.

Storage Requirement Table 600

Figure 5:
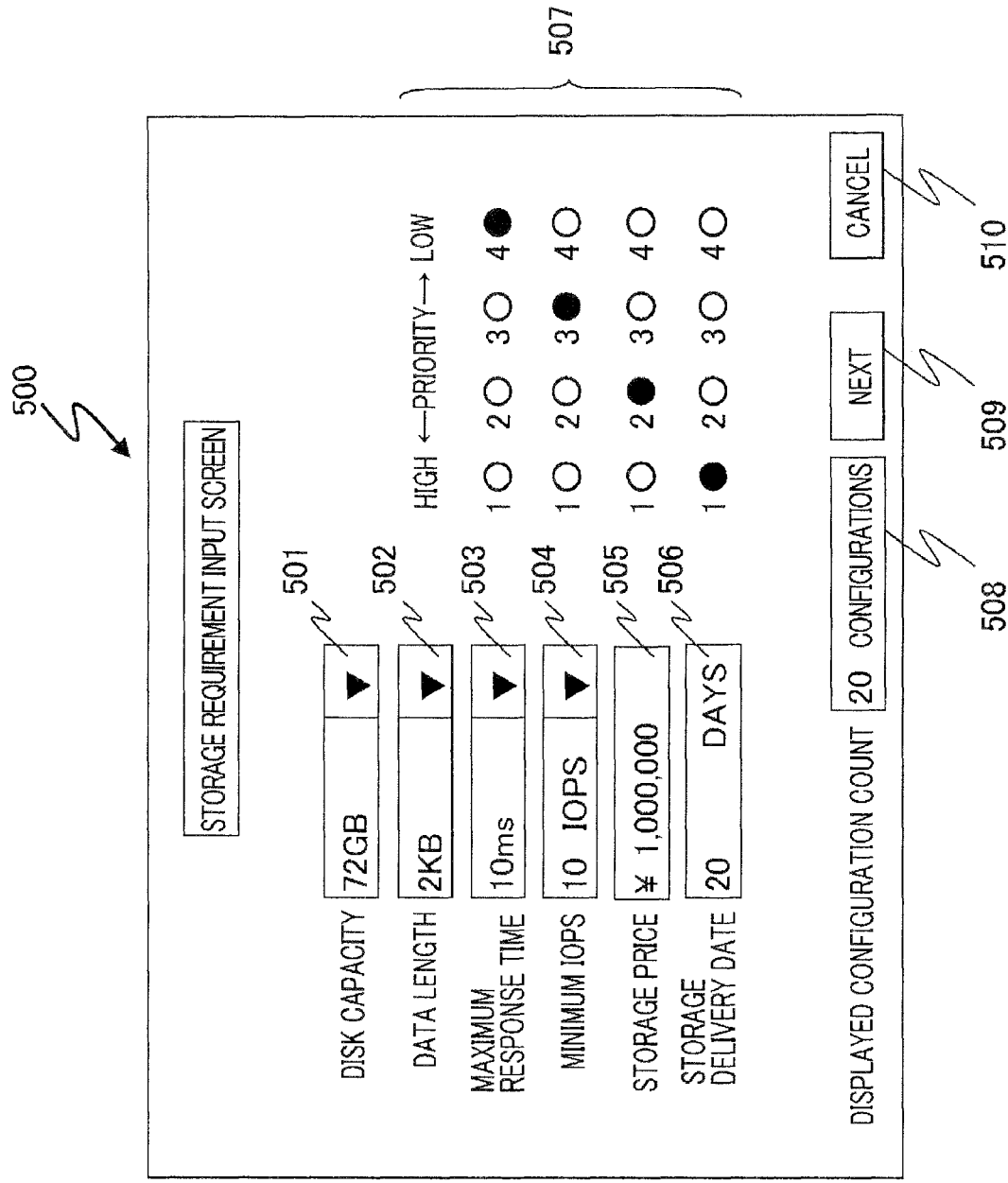
FIG. 5 is a diagram showing an example of a storage requirement input screen 500.

FIG. 5 shows an example of the storage requirement input screen 500 and FIG. 6 shows an example of the storage requirement table 600.

The storage requirement input screen 500 is the user interface for inputting the conditions required of the storage system by the user related to the performance, the price, and the delivery date (the required performance conditions, the required price conditions, and the required delivery date conditions), created by the configuration condition input/output unit 151 of the user Web server 150, and transmitted to the user terminal 140. The data input from the storage requirement input screen 500 is recorded in the storage requirement table 600 in the configuration condition storage unit 163 of the configuration creation server 160.

The storage requirement input screen 500 includes a disk capacity input field 501, a data length input field 502, a maximum response time input field 503, a minimum lops input field 504, a storage price input field 505, a storage delivery date input field 506, a priority selection field 507, and a displayed configuration count input field 508. A "Next" button 509 is for the transition to another user interface after inputting the above-mentioned fields while the "Cancel" button 510 is for clearing the already input field. Note that, for simplifying the description, for example, the contents of the disk capacity input in the storage requirement table 600 from the disk capacity input field 501, including the record field of the relevant table, is hereinafter referred to as the "disk capacit 501." The same notation is applied to the input field of the other input screens.

The disk capacity 501 is the storage capacity required of the storage system by the user. The data length 502 is the data capacity written or read per data input/output performed by the user in the storage system. The performance of the storage system, even if the data input/output frequency per unit time (e.g. IOPS) is equal, may differ if the data capacity per data input/output differs. Therefore, the user is required to input the data length.

The maximum response time 503 is the maximum allowable value of the response time required per data input/output required by the user. The minimum IOPS 504 is the minimum allowable value of the data input/output frequency per unit time required by the user and, in this embodiment, the data input/output frequency per second (I/O Per Second) is the unit for input.

The storage price 505 is the maximum allowable value of the purchase price of the storage system for the user. The storage delivery date 506 is the latest allowable delivery date for the user. Though FIG. 5 shows the example in which the values for the disk capacity 501, data length 502, maximum response time 503, and the minimum IOPS 504 can be selected from the pull-down menu, directly inputting the values in the respective fields may also be permitted.

The priority selection field 507 is set for the user to specify the priority of the maximum response time 503, the minimum IOPS 504, the storage price 505, and the storage delivery date 506 by four levels from the highest 1 to the lowest 4. The contents input in the priority selection field 507 are recorded in the priority table 700 to be described later.

The displayed configuration count 508 is set for specifying the maximum number of displayed candidate configurations extracted by the configuration condition search unit 161 and the configuration condition creation unit 162 to be described later. The input value in the displayed configuration count 508 is reflected on, for example, the user interface screen creation processing in the configuration condition input/output unit 151 of the user Web server 150.

In the storage requirement table 600 shown in FIG. 6, the disk capacity 501, the data length 502, the maximum response time 503, the minimum IOPS 504, the storage price 505, the storage delivery date 506, and the displayed configuration count 508 input from the storage requirement input screen 500 are recorded as one record. The requirement ID 601 is the identification numeral given to each record of the storage requirements set by the user to be distinguished from each other, and the unique identification numeral is automatically issued each time a record is added to the storage requirement table 600. Note that all the input values shown in the storage requirement input screen 500 and the storage requirement table 600 in FIG. 5 are merely exemplary.

Priority Table 700

FIG. 7 shows an example of the priority table 700. The priority table 700 records the combination of the maximum response time 503, the minimum IOPS 504, the storage price 505, and the storage delivery date 506 input in the storage requirement table 600 by the user as one record. A priority ID 701 is the identification numeral given to each record to be distinguished from each other and, in this embodiment, the unique identification numeral is automatically issued each time a record is added to the priority table 700.

System Condition Table 900

Figure 8:
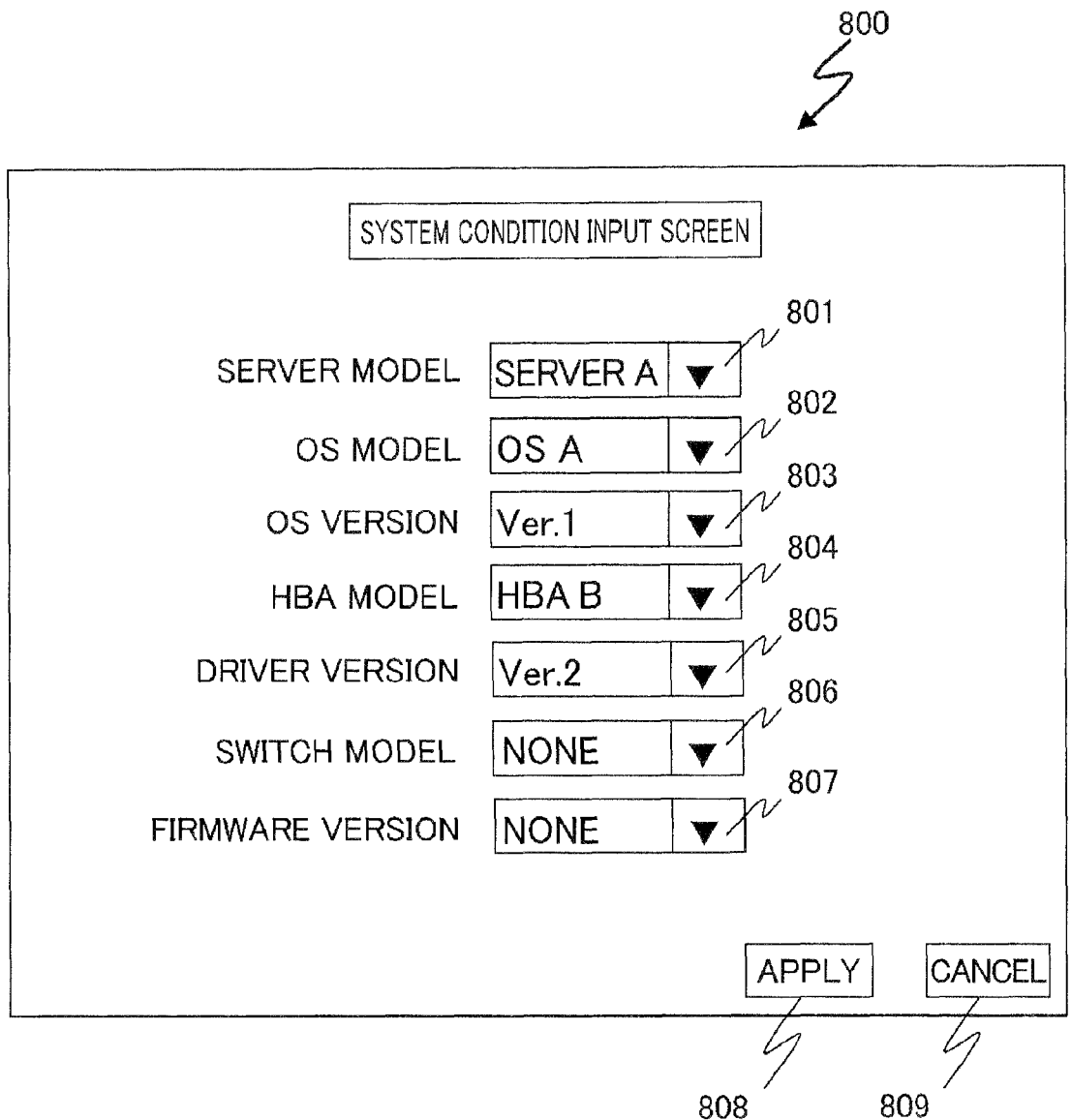
FIG. 8 is a diagram showing an example of a system condition input screen 800.
Figure 9H:
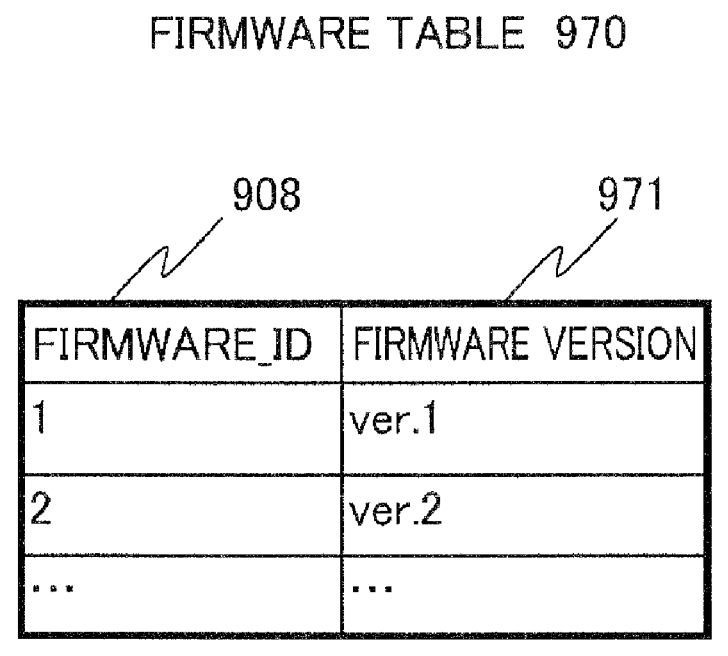

FIG. 8 shows an example of a system condition input screen 800 in the storage configuration management system 1 of this embodiment, and FIG. 9A shows an example of a system condition table 900 (system condition storage unit) storing the combination of the input items (required system conditions) input by the user through the system condition input screen 800 while FIGS. 9B to 9H show the examples of a host table 910, an OS table 920, an OS version table 930, an HBA table 940, a driver table 950, a switch table 960, and a firmware table 970 for associating the input items from the system condition input screen 800 with the system condition table 900.

The system condition input screen 800 is set for selecting various components of the storage system which the user intends to configure and for creating the desired configuration. The system condition input screen 800 is created, for example, by the configuration condition input/output unit 151 of the user Web server 150 and transmitted to the user terminal 140. Furthermore, the system condition input screen 800 is also provided to the vendor terminal 110, created by the configuration information input/output unit 121 of the vendor Web server 120, and transmitted to the vendor terminal 110.

In the system condition input screen 800, the fields of a server model 801, an OS model 802, an OS version 803, an HBA model 804, a driver version 805, a switch model 806, and a firmware version 807 are set, and the desired items can be selected from the pull down menu. The "Apply" button 808 is for determining the input contents of the system condition input screen 800 and transmitting them to the configuration creation server 160. The "Cancel" button 809 is for clearing the already input item.

In the server model 801, the model of the server computer used by the user in the storage system as the host is input. As for the model of the server computer, the candidates are stored as the model 911 in the host table 910 of FIG. 9B, and the host ID 902 as the identification numeral to be distinguished from each other is recorded in the model 911. The model 911 stored in the host table 910 is called by the pull down menu of the server model 801 to the system condition input screen 800, from which the user can select the desired item. The alternative "None" is also set for the user to select if there is no model 911 to select, such as when the user is considering using a new product, and the same alternative is set for the other input fields. FIG. 8 shows the example in which "Server A" is selected from the host table 910 of FIG. 9B.

In the OS model 802, the model of the OS to operate in the server computer used by the user is input. As for the OS model, the candidates are stored as the model 921 in the OS table 920 of FIG. 9C, and an OS ID 903 as the identification numeral to be distinguished from each other is recorded in the model 921. The model 921 stored in the OS table 920 is called by the pull down menu of the OS model 802 to the system condition input screen 800, from which the user can select the desired item. FIG. 8 shows the example in which "OS A" is selected from the OS table 920 of FIG. 9C.

In the OS version 803, the version of the OS to operate in the server computer used by the user as the host of the storage system is input. The candidates are stored as the version 931 in the OS version table 930 of FIG. 9D, and the version 931 stored in the OS version table 930 is called by the pull down menu of the OS version 803 to the system condition input screen 800, from which the user can select the desired item. FIG. 8 shows the example in which "Ver. 1" is selected from the OS version table 930 of FIG. 9D.

In the HBA model 804, the model of the HBA (Host Bus Adapter) used by the user in the storage system is input. An HBA installed in the server computer which is the host of the storage system is a communication interface with the communication network between the host and the storage device. The HBA is the SCSI controller for the SCSI connection, and the channel adapter for the FC (Fibre Channel) connection. As for the HBA model, the candidates are stored as the model 941 in the HBA table 940 of FIG. 9E, and an HBA ID 904 as the identification numeral to be distinguished from each other is recorded in each model 941. The model 941 stored in the HBA table 940 is called by the pull down menu of the HBA model 804 to the system condition input screen 800, from which the user can select the desired item. FIG. 8 shows the example in which "HBA B" is selected from the HBA table 940 of FIG. 9E.

In the driver version 805, the model of the device driver software for operating the HBA used by the user is input. As for the version of the device driver, the candidates are stored as the version 951 in the driver table 950 of FIG. 9F, and a driver ID 906 as the identification numeral to be distinguished from each other is recorded in each version 951. The version 951 stored in the driver table 950 is called by the pull down menu of the driver version 805 to the system condition input screen 800, from which the user can select the desired item. FIG. 8 shows the example in which "Ver. 2" is selected from the driver table 950 of FIG. 9F.

In the switch model 806, the model of the switch used by the user in the network of the storage system is input. A switch is an equipment to perform routing of data I/O among a plurality of hosts and a plurality of storage devices connected via the network, for example, the FC switch is installed for the FC connection. As for the switch model, the candidates are stored as the model 961 in the switch table 960 of FIG. 9G, and a switch ID 907 as the identification numeral to be distinguished from each other is recorded in each model 961. The model 961 stored in the switch table 960 is called by the pull down menu of the switch model 806 to the system condition input screen 800, from which the user can select the desired item. FIG. 8 shows the example in which "None" is selected since there is no candidate for the user to select.

In the firmware version 807, the version of the firmware to operate in the switch used by the user in the network of the storage system is input. As for the firmware version, the candidates are stored as the firmware version 971 in the firmware table 970 of FIG. 9H, and a firmware ID 908 as the identification numeral to be distinguished from each other is recorded in each firmware version 971. The firmware version 971 stored in the firmware table 970 is called by the pull down menu of the firmware version 807 to the system condition input screen 800, from which the user can select the desired item. FIG. 8 shows the example in which "None" is selected since there is no candidate for the user to select.

The description returns to the system condition table 900 in FIG. 9A. In the system condition table 900, the records including the items from the server model 801 to the firmware version 807 of the switch selected by the user on the system condition input screen 800 are recorded, and the combination ID 901 which is the identification numeral to be distinguished from each other is given to each record. The combination ID 901 is automatically issued each time a record is added. The correspondence of the user selection on the system condition input screen 800 with the fields from the host ID 902 to the firmware ID 908 in FIG. 9A is specified by the tables from the host table 910 in FIG. 9B to the firmware table 970 in FIG. 9H. Note that, as the switch model 806 and the firmware version 807 are not selected on the system condition input screen 800 in the example shown in FIG. 8, "0" is recorded as the corresponding switch ID 907 and the firmware ID 908.

Storage Configuration Table 1100

Figure 10:
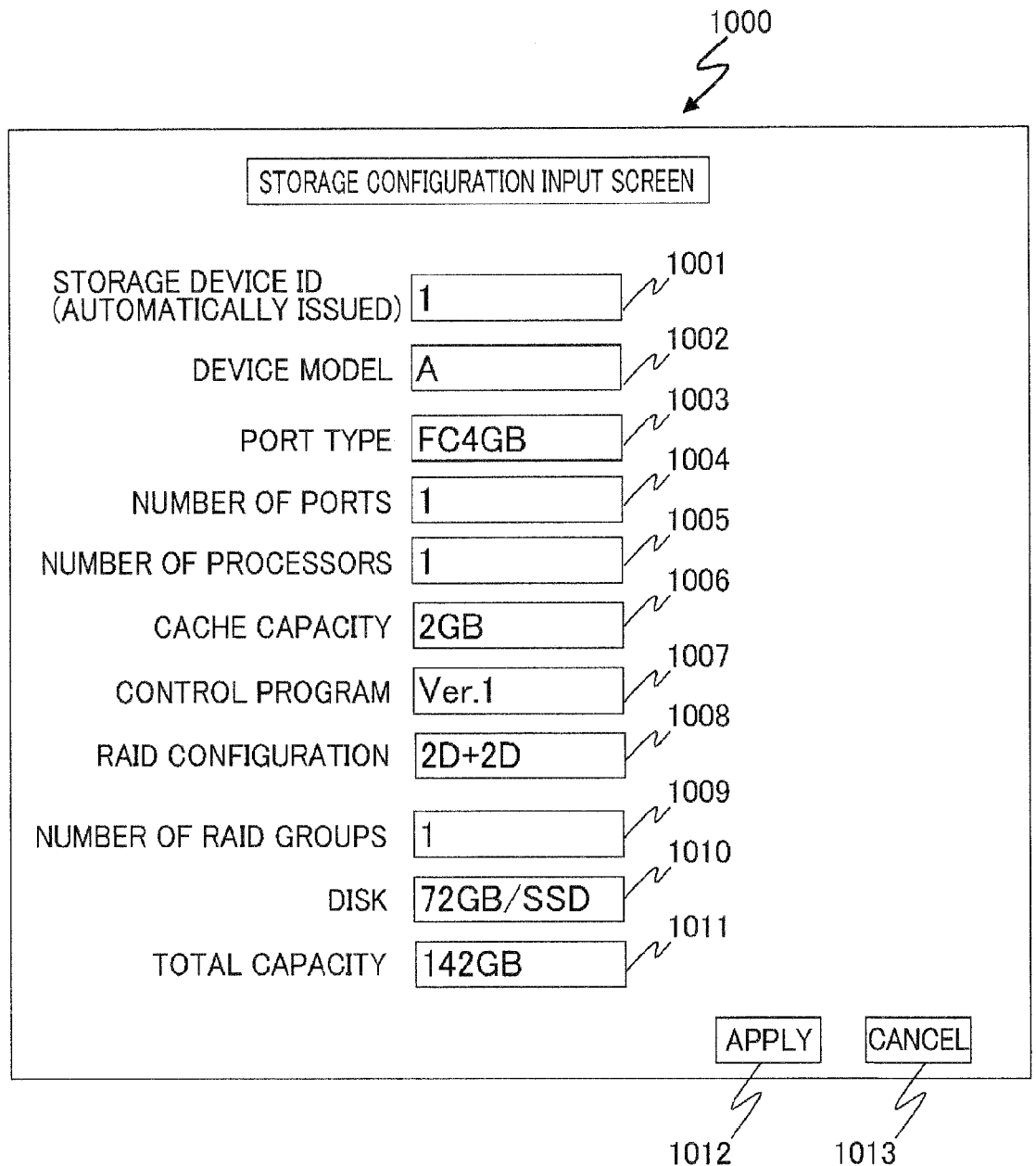
FIG. 10 is a diagram showing an example of a storage configuration input screen 1000.

FIG. 10 shows an example of a storage configuration input screen 1000 used by the storage configuration management system 1 of this embodiment, and FIG. 11 shows an example of a storage configuration table 1100 (storage configuration storage unit). The storage configuration input screen 1000 is the input interface for the vendor to store the configuration of the storage devices which can be applied to the storage system configured by the user in the configuration condition storage unit 132 of the configuration management server 130 in advance, created by the configuration information input/output unit 121 of the vendor Web server 120, and transmitted to the vendor terminal 110. Note that the storage configuration table 1100 updated by the input from the storage configuration input screen 1000 in the configuration condition storage unit 132 of the configuration management server 130 is copied to the configuration condition storage unit 163 of the configuration creation server 160 at an appropriate point of time.

The storage configuration input screen 1000 includes the input fields of a storage device ID 1001, a device model 1002, a port type 1003, a number of ports 1004, a number of processors 1005, a cache capacity 1006, a control program 1007, a RAID configuration 1008, a number of RAID groups 1009, a disk 1010, and a total capacity 1011. The "Apply" button 1012 is for determining the input items of the storage configuration input screen 1000 and transmitting them to the configuration management server 130. The "Cancel" button 1013 is for clearing the already input field.

The storage device ID 1001 is the unique identification numeral which is automatically issued each time the storage configuration input screen 1000 is called by the vendor terminal 1100 to distinguish each created storage configuration. In the device model 1002, the product name, the model number and other information given to the storage device including the input configuration are input. In the port type 1003, the type of the communication port included in the storage device configuration to be input is input. The example of FIG. 10 shows that the communication port corresponds with the FC network whose communication speed is 4 GB. Other port types include iSCSI, NAS, etc. In the number of ports 1004, the number of communication ports included in the storage device is input.

In the number of processors 1005, the number of processors included in the DKC (DisK Controller) controlling data input/output of the storage device to and from the storage media is input. In the cache capacity 1006, the capacity of the cache memory set in the DKC of the storage devices is input. In the control program 1007, the version of the program installed in the DKC, executed by the processor, and controlling the data input/output of the host to and from the storage media is input. In the RAID configuration 1008, the configuration of the RAID group organized by the storage media is input. The example of FIG. 10 records that two data disks at a time are organized in the mirroring configuration. Other types of configuration, for example, the "3D+1P" configuration including three data disks and one parity disk, can be employed.

In the number of RAID groups 1009, the number of installed RAID groups including the above-mentioned RAID configuration is input. In the disk 1010, the storage capacity and the model of physical disks as storage media is input in the form of "HDD" or the like. In the example of FIG. 10, SSDs (Solid State Disks) are applied as the disk type, and the storage capacity per disk is recorded as 72 GB. The total capacity 1011 is the total storage capacity provided by the storage devices, and the example of FIG. 10 records 142 GB which is actually the capacity of two disks. In the storage configuration table 1100 of FIG. 11, as mentioned above, the information related to the configuration of the storage devices input by the vendor on the storage configuration input screen 1000 is recorded.

Performance Table 1300

Figure 12:
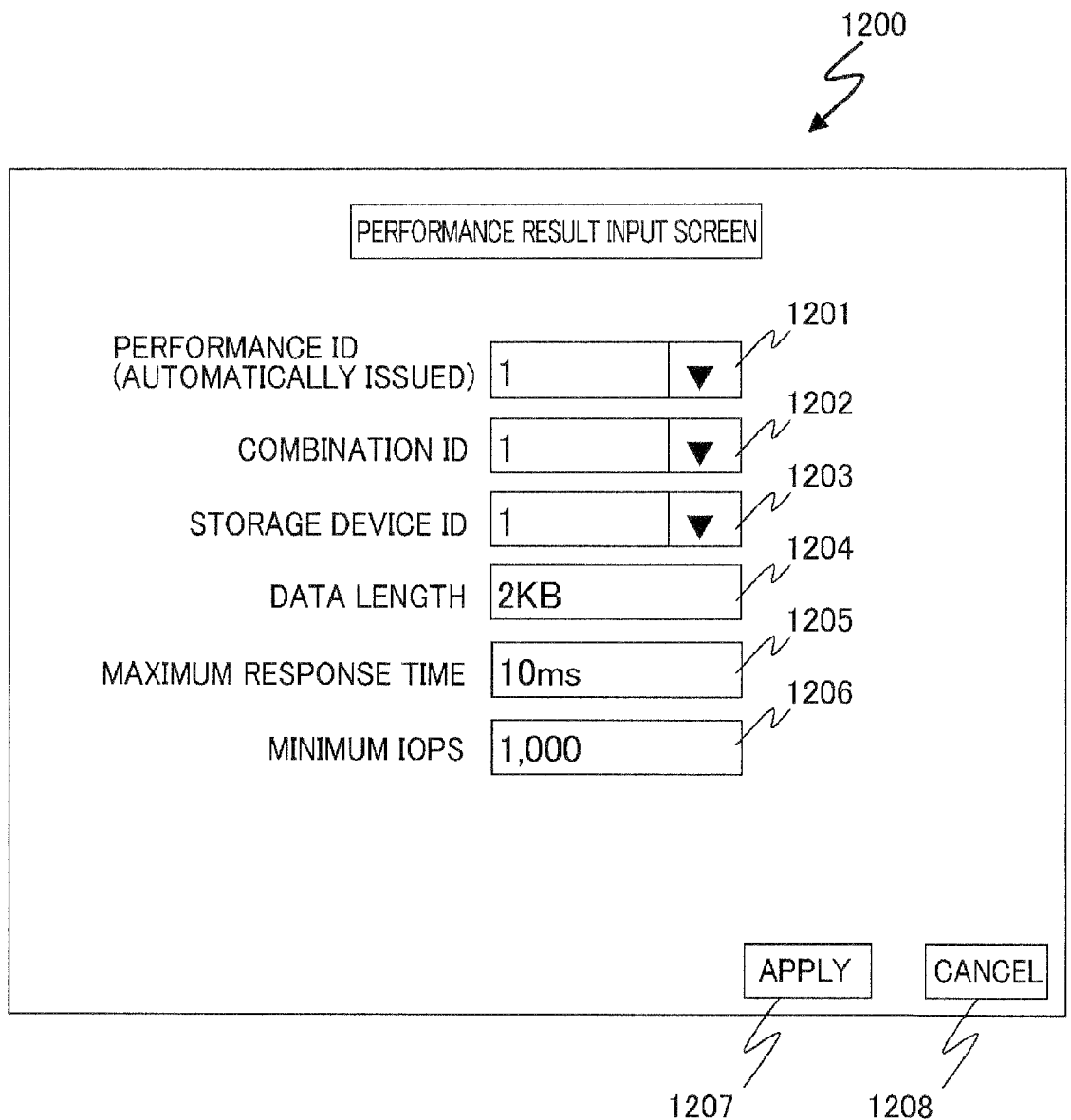
FIG. 12 is a diagram showing an example of a performance result input screen 1200.

FIG. 12 shows an example of a performance result input screen 1200 in the storage configuration management system 1 of this embodiment, and FIG. 13 shows an example of a performance table 1300 (performance condition storage unit). The performance table 1300 maintains the result related to the combinations for which the vendor actually connected the components of the storage system (the host, the HBA, the switch, and the storage device) and examined the performance. The performance result input screen 1200 is created by the configuration information input/output unit 121 of the vendor Web server 120 and transmitted to the vendor terminal 110. Note that the performance table 1300 updated by the performance result input screen 1200 in the configuration condition storage unit 132 of the configuration management server 130 is copied to the configuration condition storage unit 163 of the configuration creation server 160 at an appropriate point of time.

In the performance result input screen 1200, a performance ID 1201, a combination ID 1202, a storage device ID 1203, a data length 1204, a maximum response time 1205, and a minimum IOPS 1206 are input. An "Apply" button 1207 is for determining the input items of the performance result input screen 1200 and transmitting them to the configuration management server 130. A "Cancel" button 1208 is for clearing the already input field.

The performance ID 1201 is the unique identification numeral automatically issued when the performance result input screen 1200 is called by the vendor terminal 110, and used for distinguishing each performance result record stored in the performance table 1300. The combination ID 1202 corresponds to the combination ID 901 recorded in the system condition table 900, and the storage device ID 1203 corresponds to the storage device ID 1100 recorded in the storage configuration table 1101. The data length 1204, the maximum response time 1205, and the minimum IOPS 1206 correspond respectively to the data length 502, the maximum response time 503, and the minimum IOPS 504 recorded in the storage requirement table 600.

The items input by the vendor from the performance result input screen 1200 are recorded in the performance table 1300. That is, the performance table 1300 enumerates the combinations of the components configuring the storage system and the performance conditions actually examined by those combinations and, by referring to this table, it can be determined whether the storage system satisfying the performance required by the user is registered in the storage configuration management system 1.

Price/Delivery Date Table 1500

Figures 14, 15:
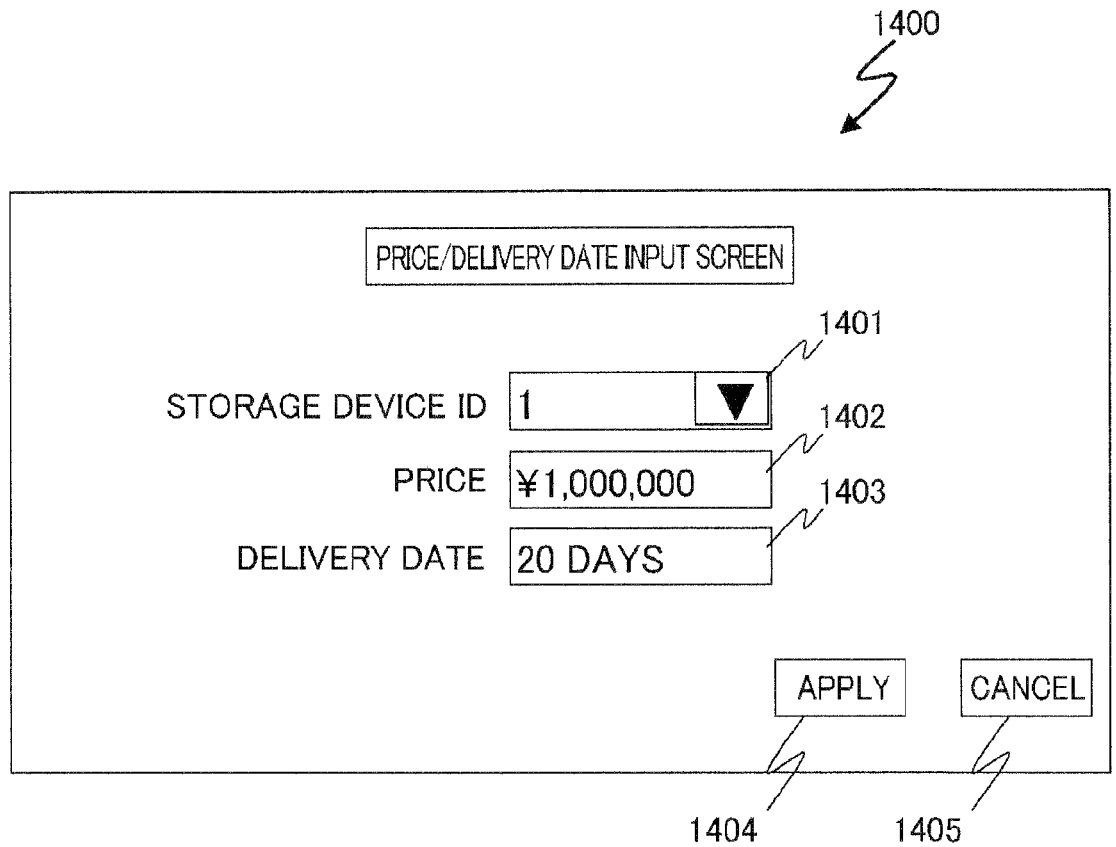
FIG. 14 is a diagram showing an example of a price/delivery date input screen 1400.
FIG. 15 is a diagram showing an example of a price/delivery date table 1500.

FIG. 14 shows an example of a price/delivery date input screen 1400 in the storage configuration management system 1 of this embodiment, and FIG. 15 shows an example of a price/delivery date table 1500 (price/delivery storage unit). The price/delivery date table 1500 records the price and the delivery date of the configuration of the storage system input by the vendor. The price/delivery date input screen 1400 is created by the configuration information input/output unit 121 of the vendor Web server 120, and transmitted to the vendor terminal 110. Note that the price/delivery date table 1500 updated by the input from the price/delivery date input screen 1400 in the configuration condition storage unit 132 of the configuration management server 130 is copied to the configuration condition storage unit 163 of the configuration creation server 160 at an appropriate point of time.

In the price/delivery date input screen 1400, a storage device ID 1401, a price 1402, and a delivery date 1403 are input. An "Apply" button 1404 is for determining the input items of the price/delivery date input screen 1400 and transmitting them to the configuration management server 130. A "Cancel" button 1405 is for clearing the already input field.

The storage device ID 1401 can be selected through the pull down menu from the storage device ID 1101 of the storage configuration table 1100 corresponding to the storage device ID 1101 recorded in the storage configuration table 1100 stored in the configuration condition storage unit 132 of the configuration management server 130. In the price 1402, the price of the storage device including the configuration corresponding to the storage device ID 1401 is input. In the delivery date 1403, the earliest delivery date of the storage device including the configuration corresponding with the storage device ID 1401 is input in the same method.

The items input from the price/delivery date input screen 1400 are recorded in the price/delivery date table 1500 of FIG. 15. By referring to this price/delivery date table 1500, it can be determined whether the storage system satisfying the price and the delivery date input on the storage requirement input screen 500 by the user is registered in the storage configuration management system 1.

Processing Performed by Storage Configuration Management System 1

Next, the storage system configuration search and creation processing implemented by the storage configuration management system 1 of this embodiment including the above-mentioned configuration is described below with reference to the related flowcharts. Note that in each flowchart the letter "S" added to the reference numeral for each processing is an abbreviation for the "step."

Overview of Storage System Configuration Search and Creation Processing by User

Figure 16:
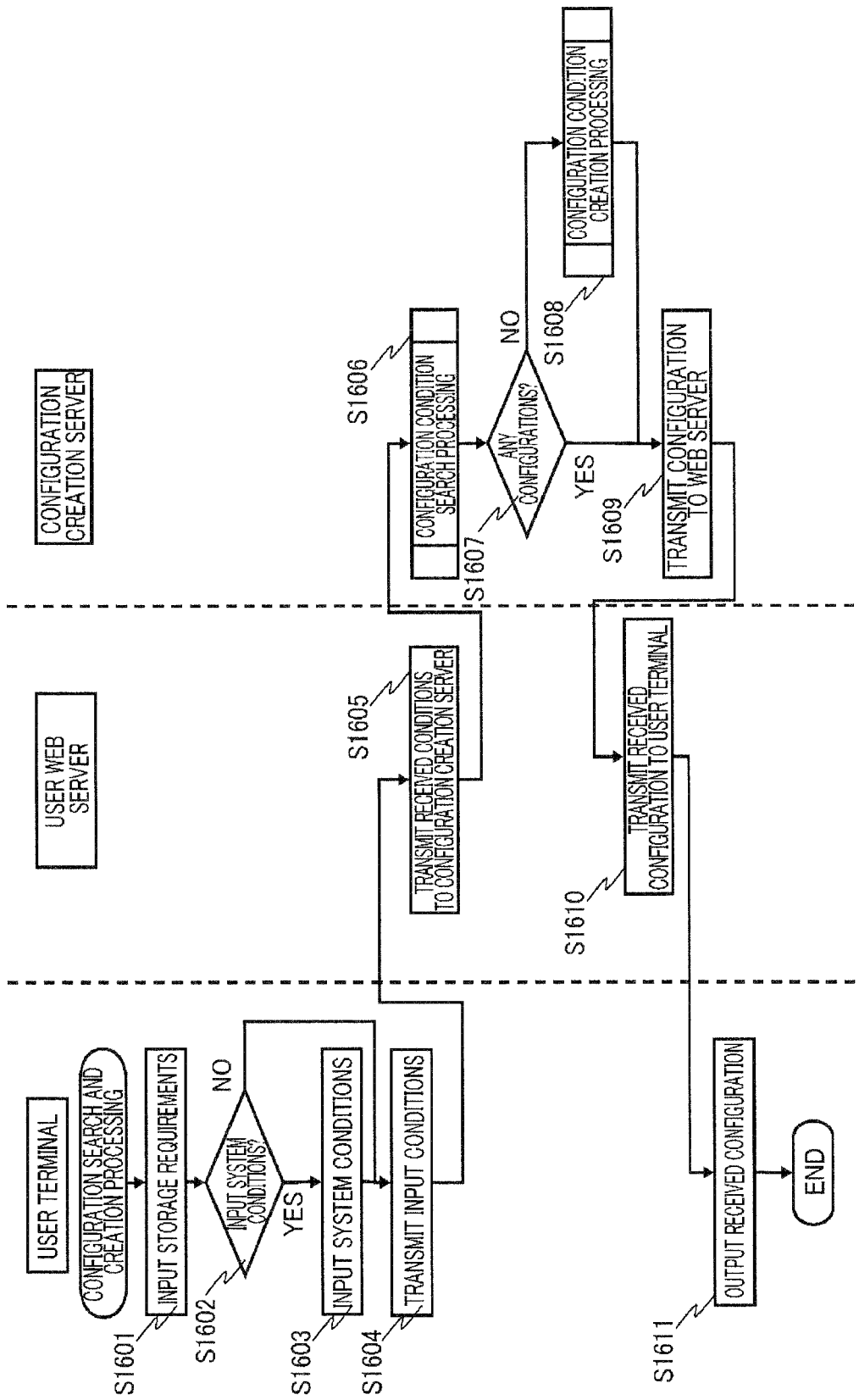
FIG. 16 is a schematic flowchart showing a configuration search and creation processing performed by the storage configuration management system 1 according to an embodiment of this invention.

FIG. 16 shows a schematic processing flowchart performed when the user searches or creates the configuration of the desired storage system by the storage configuration management system 1. Firstly, the user inputs the desired storage conditions by the storage requirement input screen 500 from the user terminal 140 (S1601). Next, it is determined whether any conditions are input with reference to whether the user has called the system condition input screen 800 (S1602) and, if any conditions are determined to be input (S1602, Yes), the system conditions input by the user are accepted (S1603). If it is determined that no system condition is input (S1602, No), the processing goes to S1604. At S1604, the input storage requirements and the system conditions if any system conditions are input, or only the storage requirements if no system condition is input, are transmitted to the user Web server 150.

The configuration condition input/output unit 151 of the user Web server 150 transmits the storage requirements and/or the system conditions received from the user terminal 140 to the configuration creation server 160 (S1605).

In the configuration creation server 160, the configuration condition input/output processing unit 164 transmits the storage requirements and/or the system conditions received from the user Web server 150 to the configuration condition search unit 161, and the configuration condition search processing is performed (S1606). This processing is described later with reference to the detailed processing flowchart.

Next, the configuration condition search unit 161 determines whether the storage configuration matching the storage requirements and/or the system conditions received from the user is registered in the configuration condition storage unit 163 (S1607) and, if it is determined to be registered (S1607, Yes), shifts the processing to S1609. If it is determined that no configuration matching the conditions from the user is registered (S1607, No), the configuration condition input/output processing unit 164 transmits the storage requirements and/or the system conditions received from the user to the configuration condition creation unit 162, where the configuration condition creation processing is performed (S1608). The configuration condition creation processing is described later with reference to the detailed processing flowchart. At S1609, the information related to the configuration of the storage system searched or created in accordance with the conditions from the user is transmitted to the user Web server 150.

The user Web server 150, when receiving the searched or created configuration information of the storage system from the configuration creation server 160, transmits the configuration information to the user terminal 140 (S1610). In this case, the configuration condition input/output unit 151 of the user Web server 150 can reconfigure the configuration information into the Web data in a suitable format and transmit it to the user terminal 140.

The user terminal 140 outputs the configuration information on the storage system received from the user Web server 150 to, for example, the display, the printer or other output devices 15 installed in the computer 10 in FIG. 2 (S1611).

According to the above-mentioned processing flow, by inputting the specified requirements such as the performance related to the storage system, the user can search the already examined storage system satisfying the requirements or easily obtain the combination of the storage system newly configured for satisfying the specified requirements.

Overview of Storage System Configuration Management Processing by Vendor

Figure 17:
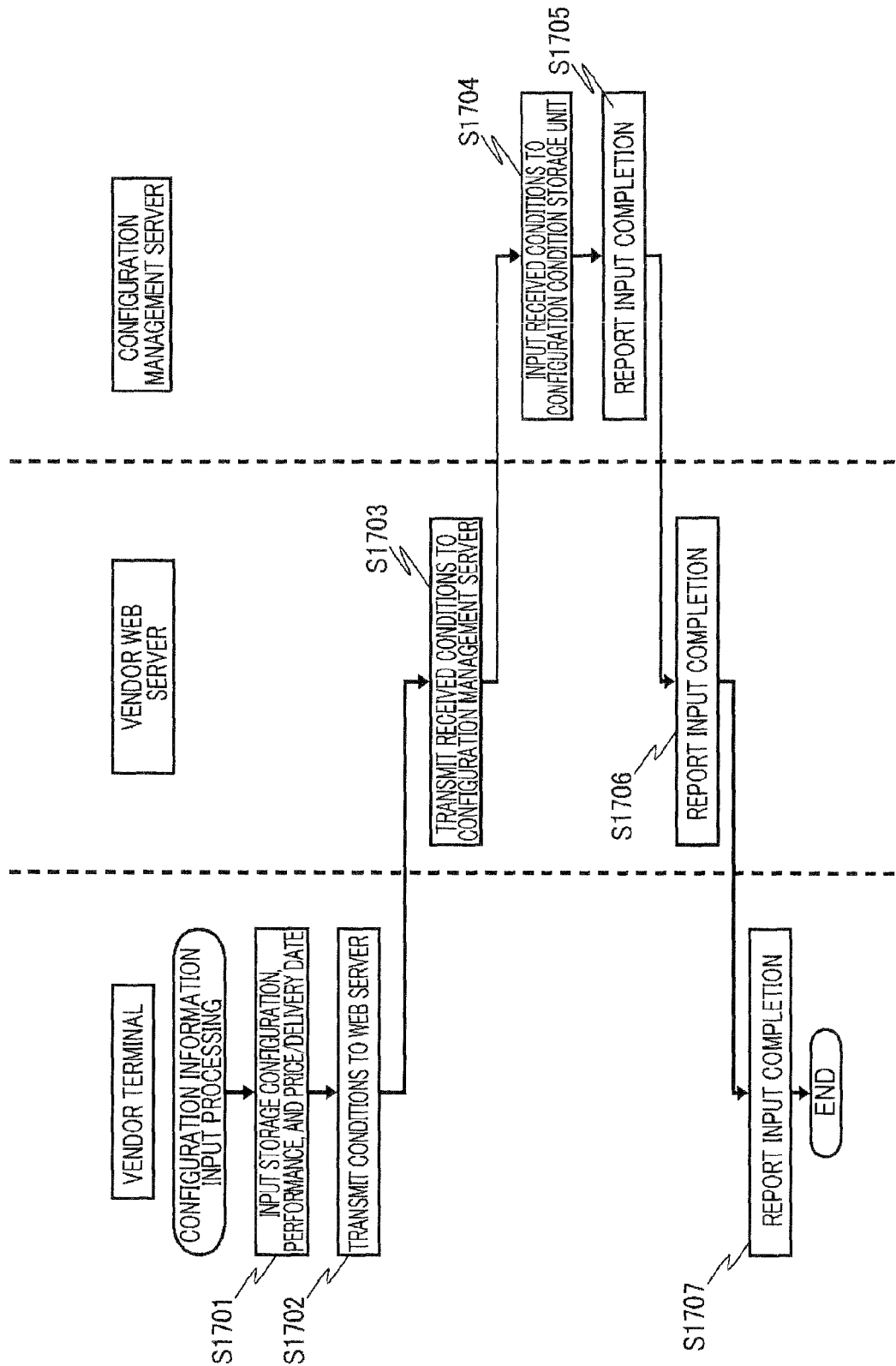
FIG. 17 is a flowchart showing an example of the configuration information input processing performed by the storage configuration management system 1 according to an embodiment of this invention.

FIG. 17 shows an example of the processing flow performed when the vendor manages the configuration of the storage system by the storage configuration management system 1 or, as more specifically described, adds or updates the data maintained in the configuration condition storage unit 132 of the configuration management server 130. Firstly, the vendor calls the storage configuration input screen 1000, the performance result input screen 1200, and the price/delivery date input screen 1400 by the vendor terminal 110, and inputs the items of those screens (S1701). The input data is transmitted to the vendor Web server 120 (S1702). The configuration information input/output unit 121 of the vendor Web server 120 transmits the received conditions to the configuration management server 130 (S1703).

In the configuration management server 130, the configuration information input/output processing unit 131 stores the conditions received from the vendor Web server 120 in the specified tables in the configuration condition storage unit 132 (S1705). When the storing into the configuration condition storage unit 132 is completed, the configuration information input/output processing unit 131 transmits the completion report to the vendor Web server 120 (S1706).

The vendor Web server 120 transmits the completion report received from the configuration management server 130 to the vendor terminal 110 (S1706), and the vendor terminal 110 outputs the completion report to, for example, the display, the printer or other output devices 15 installed in the computer 10 of FIG. 2 (S1707).

According to the above-mentioned processing flow, the vendor can appropriately update the information on the performance, the delivery date, and the price of the configuration of the storage system in the configuration management server 130 and provide the information to the user.

Configuration Search Processing Flow

Figure 18:
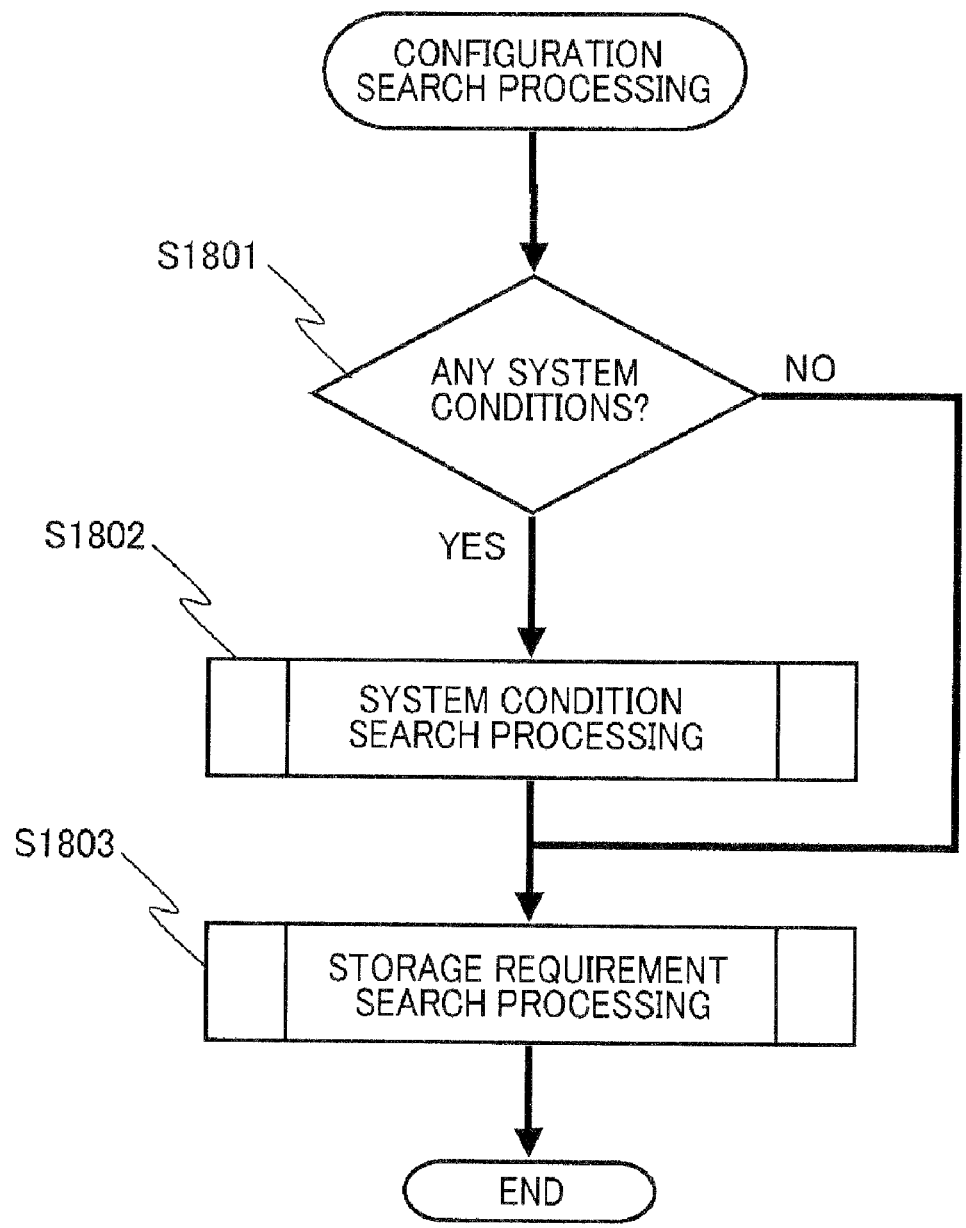
FIG. 18 is a schematic flowchart showing the configuration search processing performed by the storage configuration management system 1 according to an embodiment of this invention.

Next, the flow of the configuration search processing performed by the configuration condition search unit 161 of the configuration creation server 160 is described below. FIG. 18 shows an example of a configuration search processing flowchart. The configuration search processing is performed for searching whether the configuration of the storage system satisfying the storage requirements and/or the system conditions input by the user is stored in the configuration condition storage unit 163.

The configuration condition search unit 161 determines whether the system requirements are included in the conditions received from the user terminal 140 (S1801). If it determines that the system conditions are included (S1801, Yes), the configuration condition search unit 161 performs the system condition search processing (S1802). If it determines that no system condition is included (S1801, No), the processing goes to S1803.

At S1803, the storage requirement search processing is performed in accordance with the storage requirements received from the user (S1803), and then the processing is completed. The system condition search processing at S1802 and the storage requirement search processing at S1803 are described later with reference to the detailed flows.

System Condition Search Processing

Figure 19:
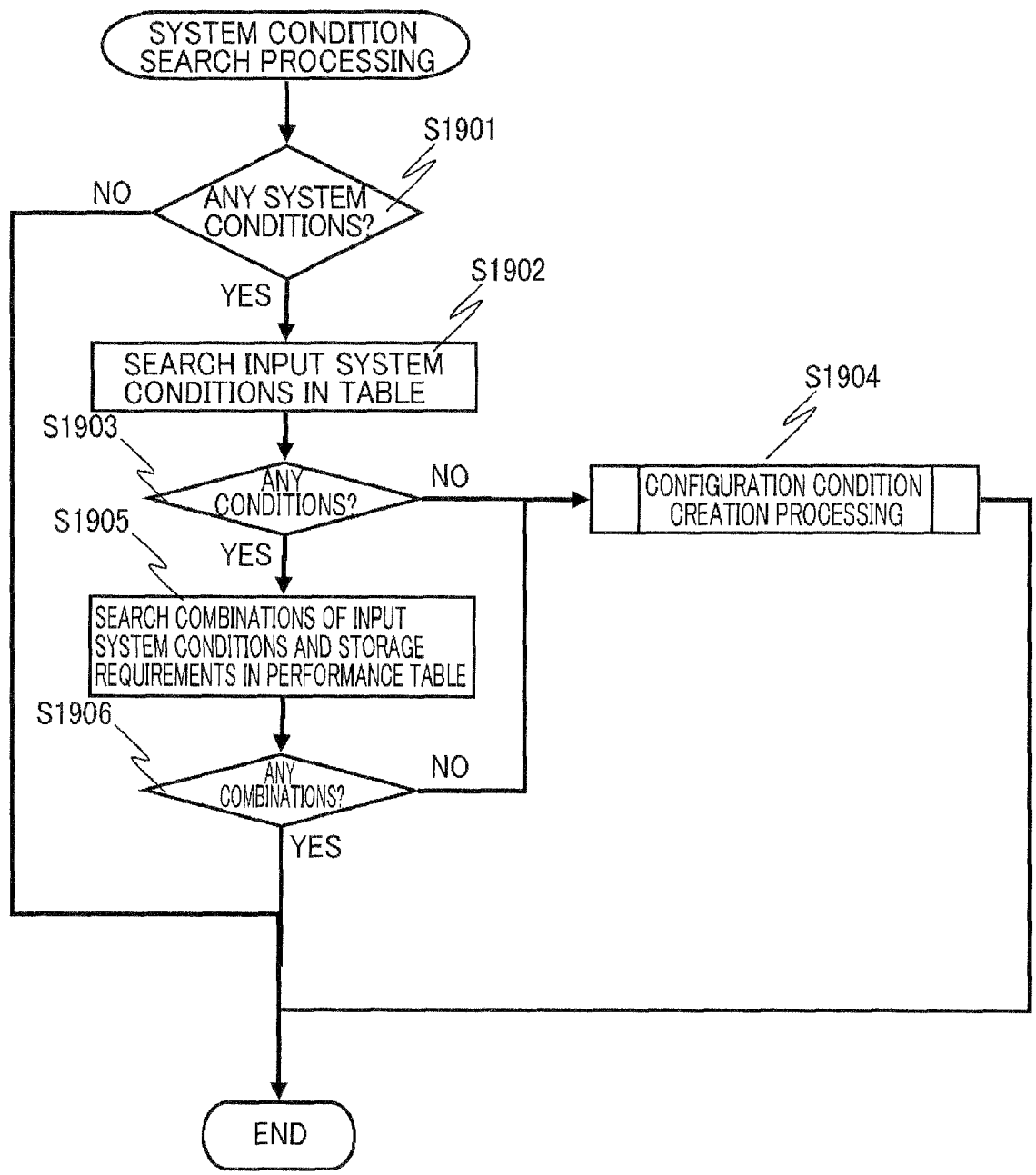
FIG. 19 is a flowchart showing an example of the system condition search processing performed by the storage configuration management system 1 according to an embodiment of this invention.

Next, the system condition search processing is described below. FIG. 19 shows an example of a system condition search processing flow. The system condition search processing is performed by the system condition search unit 1611 included in the configuration condition search unit 161 of the configuration creation server 160.

Firstly, the system condition search unit 1611 determines whether any system conditions are included in the user input received from the user terminal 140 (S1901). If it determines that the system conditions are included (S1901, Yes), the system condition search unit 1611 refers to the system condition table 900 of the configuration condition storage unit 163, performs the search according to the system conditions input by the user (S1902), and determines whether there are any combinations matching the input system conditions (S1903).

If the system condition search unit 1611 determines that there are combinations matching the input system conditions (S1903, Yes), the system condition search unit 1611 searches the performance table 1300 of the configuration condition storage unit 163 with the input combinations of the system conditions and the storage requirements (S1905), and determines whether there are any combinations (S1906). If it is determined that there are combinations (S1906, Yes), the system condition search unit 1611 completes the system condition search processing, and shifts the processing to S1803 (storage requirement search processing) in FIG. 18.

If it is determined at S1903 that there is no combination matching the input system conditions and if it is determined at S1906 that there is no combination, the processing goes to the configuration condition creation processing at S1904.

According to the above-mentioned system condition search processing, the user can easily ascertain whether any configurations of the storage system satisfying the system conditions input by the user are recorded in the storage system configuration management system 1 and, if there are any combinations already recorded, can obtain the information on the combination.

Storage Requirement Search Processing

Figure 20:
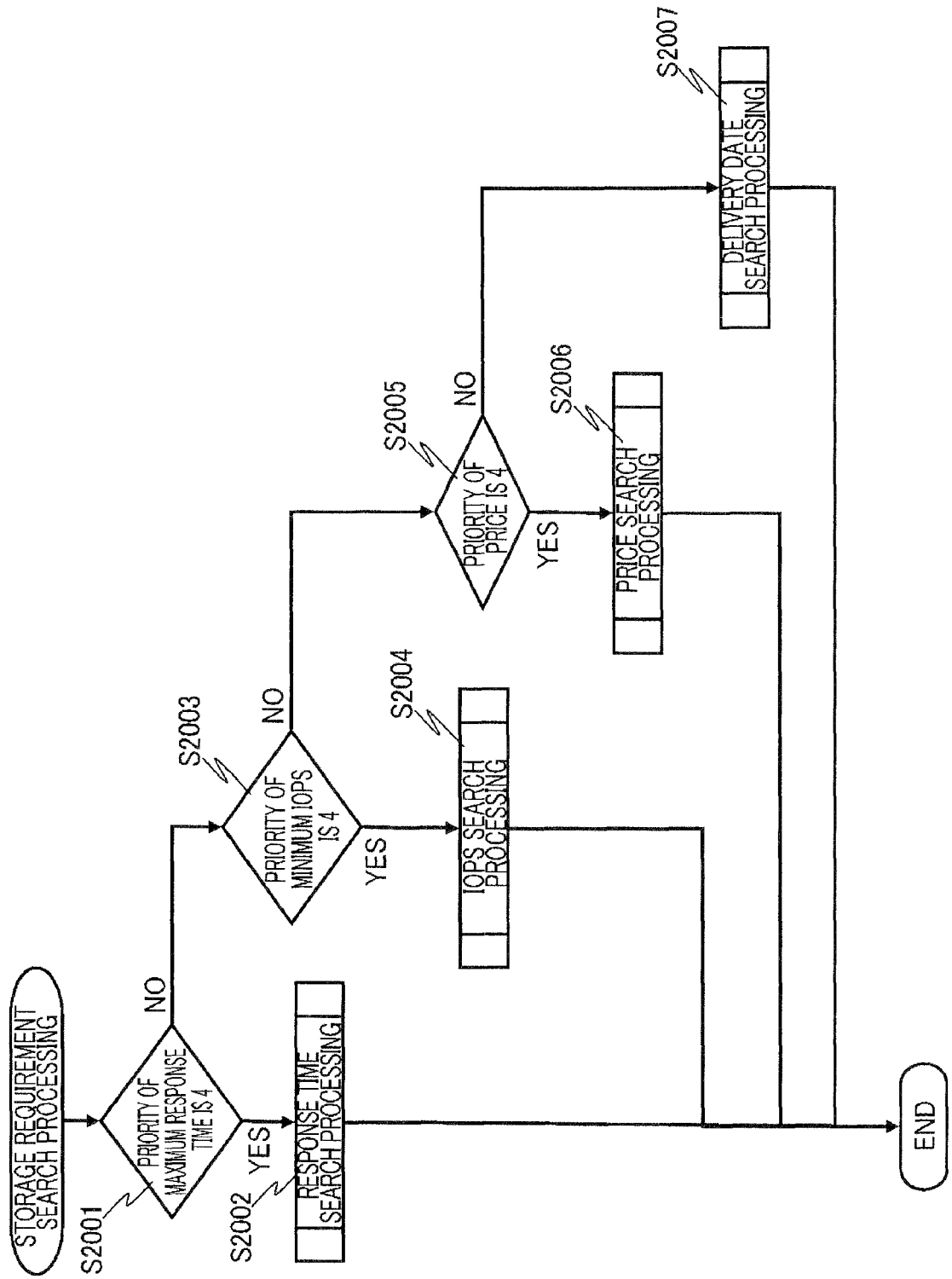
FIG. 20 is a flowchart showing an example of the storage requirement search processing performed by the storage configuration management system 1 related to an embodiment of this invention.

Next, the storage requirement search processing is described below. FIG. 20 shows the flowchart of the storage requirement search processing. The storage requirement search processing is performed by the storage requirement search unit 1612 included in the configuration condition search unit 161 of the configuration creation server 160.

The storage requirement search unit 1612, when receiving the storage requirements from the user, firstly refers to the priority table 700 in the configuration condition storage unit 163 of the configuration creation server 160, and determines whether the priority recorded in the maximum response time 702 is "4" (S2001). If the priority is determined to be "4" (S2001, Yes), the processing goes to the response time search processing (S2002).

The priority of the maximum response time is determined not to be "4" (S2001, No), the storage requirement search unit 1612 subsequently determines whether the priority of the minimum IOPS 703, the price 704, and the delivery date 705 respectively recorded in the priority table 700 is "4" (S2003, S2005, and S2007) by the same method and, if it is determined to be "4" (S2003, S2005, and S2007, Yes), performs the IOPS search processing (S2004), the price search processing (S2006), and the delivery date search processing (S2008). Note that the response time search processing, the IOPS search processing, the price search processing, and the delivery date search processing are described later with reference to the detailed flowcharts. Also note that, though this embodiment assumes the configuration in which the search processing is performed in order of ascending priority for the items, the opposite configuration in which the search processing is performed in order of descending priority may also be permitted.

The above-mentioned storage requirement search processing enables efficient search for the combinations of storage systems stored in the configuration condition storage unit 163 in accordance with the storage requirements, the priority of the maximum response time, the minimum IOPS, the price, and the delivery date specified by the user.

Response Time Search Processing

Figure 21:
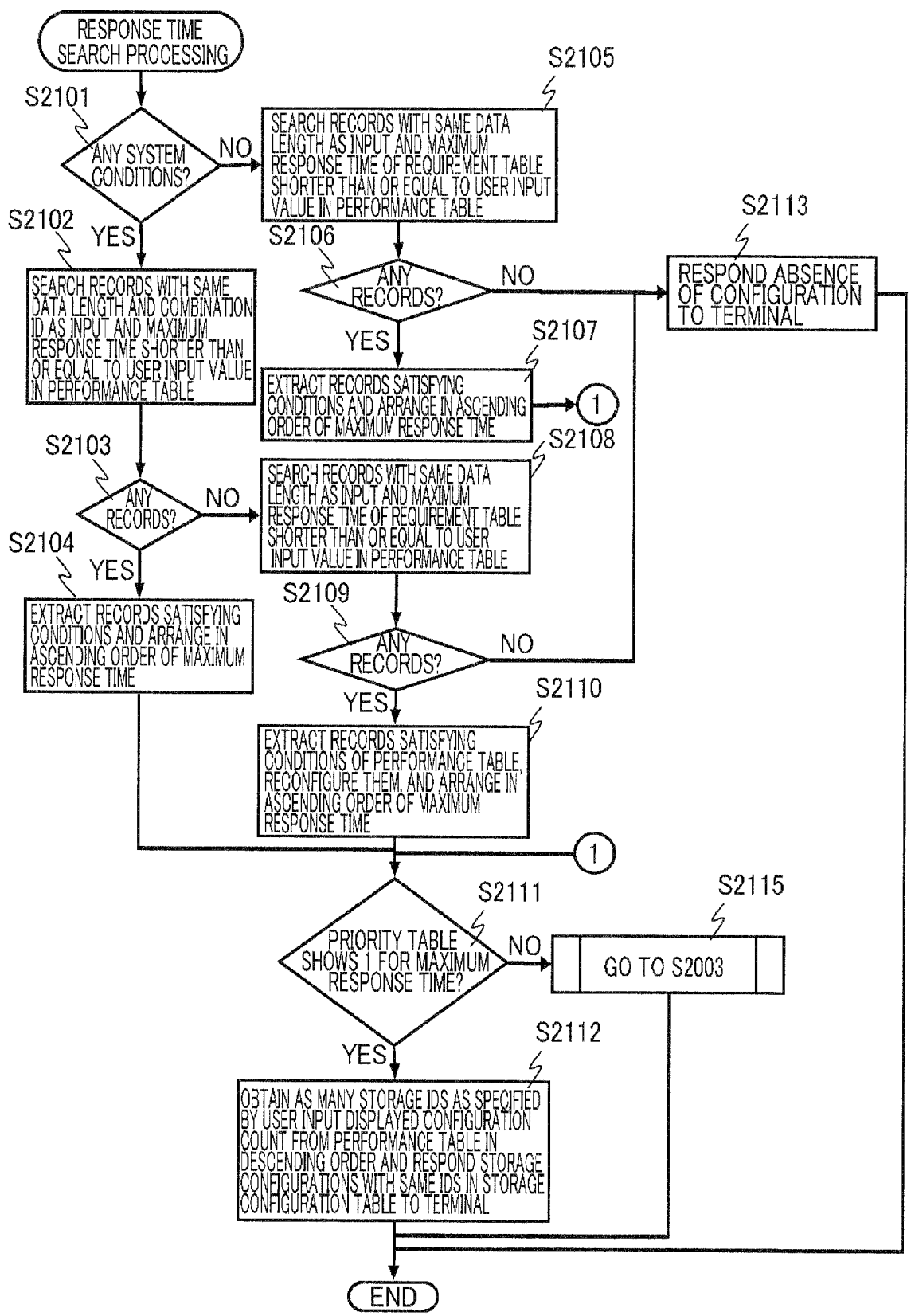
FIG. 21 is a flowchart showing an example of the response time search processing performed by the storage configuration management system 1 according to an embodiment of this invention.

Next, the search processing for each requirement performed in the storage requirement search processing is described below one by one. Firstly, the response time search processing is described. FIG. 21 shows an example of the response time search processing. The response time search processing is performed by the response time search unit 1613 of the configuration condition search unit 161 in the configuration creation server 160.

The response time search unit 1613 determines whether the user has input the system conditions (S2101) and, if it determines that there are system conditions (S2101, Yes), refers to the performance table 1300 of the configuration condition storage unit 163, searches and determines whether there are any records with the same data length and the combination ID as the data length input by the user from the storage requirement input screen 500 and the combination ID input from the system condition input screen 800 and with the maximum response time 1205 shorter than or equal to the user input value (S2102, S2103). If the response time search unit 1613 determines that there are the relevant records (S2103, Yes), the response time search unit 1613 extracts the relevant records from the performance table 1300, and arranges them in ascending order of the maximum response time (S2104).

Note that at S2102 only the records with the same data length and the combination ID as those specified by the user are searched because the configuration of the storage system is optimized in accordance with the default value of the data length and even the storage system of the same configuration might not be able to achieve the specified performance if the data length is different.

Next, the response time search unit 1613 refers to the priority table 700 of the configuration condition storage unit 163, and examines whether "1" for the highest priority specified by the user is recorded for the maximum response time 702 (S2111). If the priority is determined to be "1" (S2111, Yes), the number of storage IDs 1203 specified in the displayed configuration count 508 by the user from the storage requirement input screen 500 are obtained from the performance table 1300 including the records extracted at S2104 in descending order, and the storage configuration corresponding to the storage IDs 1203 obtained from the storage configuration table 1100 is obtained and transmitted to the user terminal (S2112).

If the priority of the maximum response time is determined not to be "1" at S2111 (S2111, No), the response time search unit 1613 shifts the processing to the search processing for the next requirement, as more specifically described, to S2003 in the storage requirement search processing in FIG. 20 (S2115).

Returning to the beginning of the processing, if it is determined that no system condition is input by the user, that is, if it is determined that no specification is input related to the components of the storage system (S2101, No), the response time search unit 1613 refers to the performance table 1300 of the configuration condition storage unit 163, searches and determines whether there are any records with the same data length as the data length input by the user from the storage requirement input screen 500 and with the maximum response time 1205 shorter than or equal to the user input value (S2105, S2106). If the response time search unit 1613 determines that there are the relevant records (S2106, Yes), the response time search unit 1613 extracts the relevant records from the performance table 1300, and arranges them in ascending order of the maximum response time (S2104). Then, the processing goes to S2111.

If it is determined at S2106 that there is no relevant record (S2106, No), the report that there is no storage configuration satisfying the performance conditions input by the user is transmitted to the user terminal 140 and the processing is completed (S2113).

Meanwhile, if it is determined at S2103 that there is no storage device configuration satisfying the conditions of the data length and the maximum response time (S2103, No), the response time search unit 1613 refers to the performance table 1300 of the configuration condition storage unit 163, searches and determines whether there are any records with the same data length as the data length input by the user from the storage requirement input screen 500 and with the maximum response time 1205 shorter than or equal to the user input value (S2108, S2109). If it determines that there are the relevant records (S2109, Yes), the response time search unit 1613 extracts the relevant records from the performance table 1300, and arranges them in ascending order of the maximum response time (S2110). Then, the processing goes to S2111

If it is determined at S2109 that there is no relevant record (S2109, No), the report that there is no storage configuration that satisfying the performance conditions input by the user is transmitted to the user terminal 140 and the processing is completed (S2113).

According to the above-mentioned response time search processing, the storage system configuration satisfying the conditions of the maximum response time specified by the user can be searched easily.

IOPS Search Processing

Figure 22:
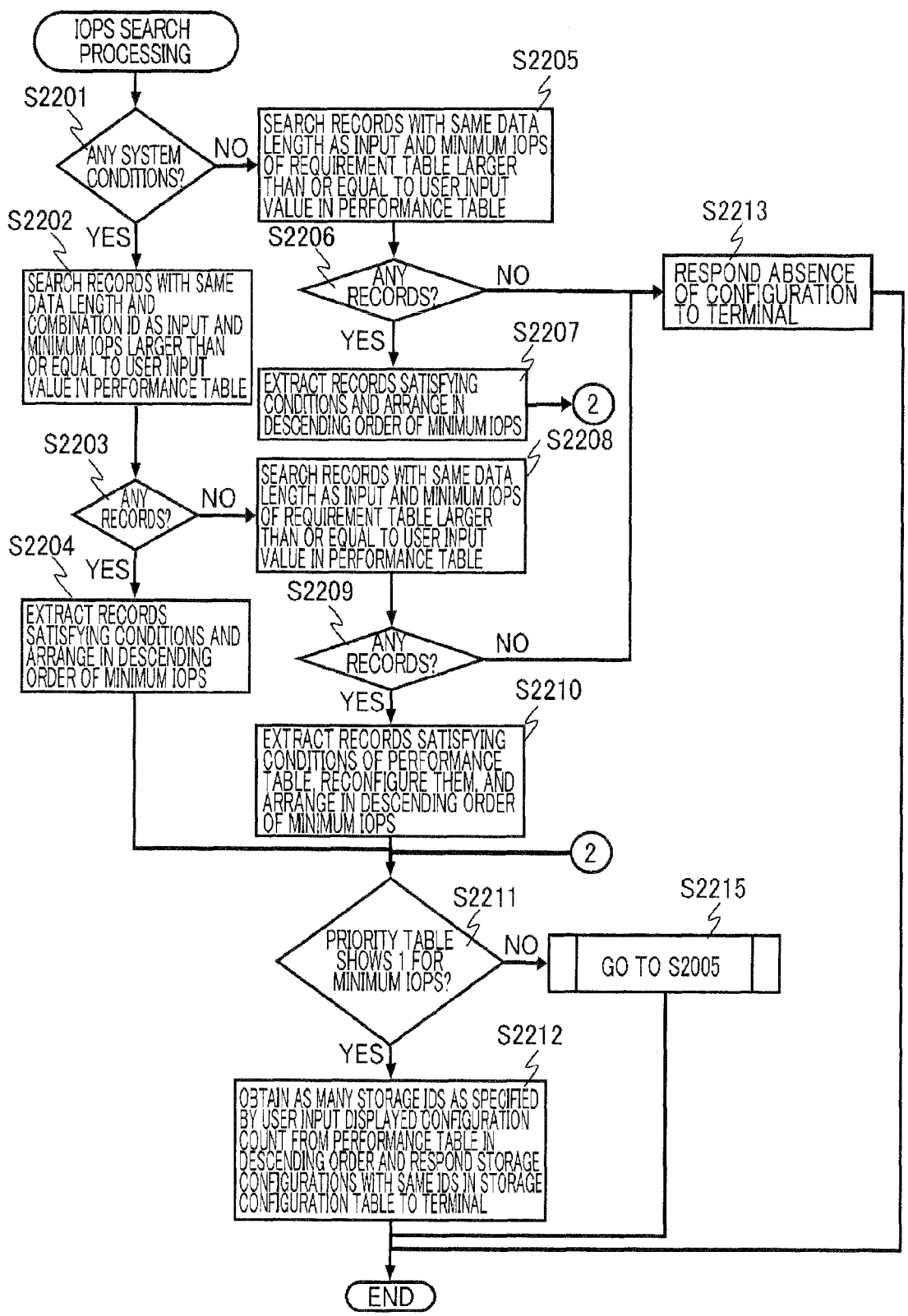
FIG. 22 is a flowchart showing an example of an IOPS search processing performed by the storage configuration management system 1 according to an embodiment of this invention.

Next, the IOPS search processing is described below. FIG. 22 shows an example of the IOPS search processing. The IOPS search processing is performed by the I/O performance search unit 1614 of the configuration condition search unit 161 in the configuration creation server 160. As the processing performed from S2201 to S2215 in FIG. 22 is identical to the processing from S2101 to S2115 in FIG. 21 if the "maximum response time" is replaced by the "minimum IOPS," the detailed description is omitted here. Note that, if the priority is determined not to be "1" at S2211 (S2211, No), the I/O performance search unit 1614 shifts the processing to the search processing for the next requirement, as more specifically described, to S2005 in the storage requirement search processing in FIG. 20 (S2215).

According to the above-mentioned IOPS search processing, the storage system configuration satisfying the conditions of the minimum IOPS specified by the user can be searched easily.

Price Search Processing

Figure 23:
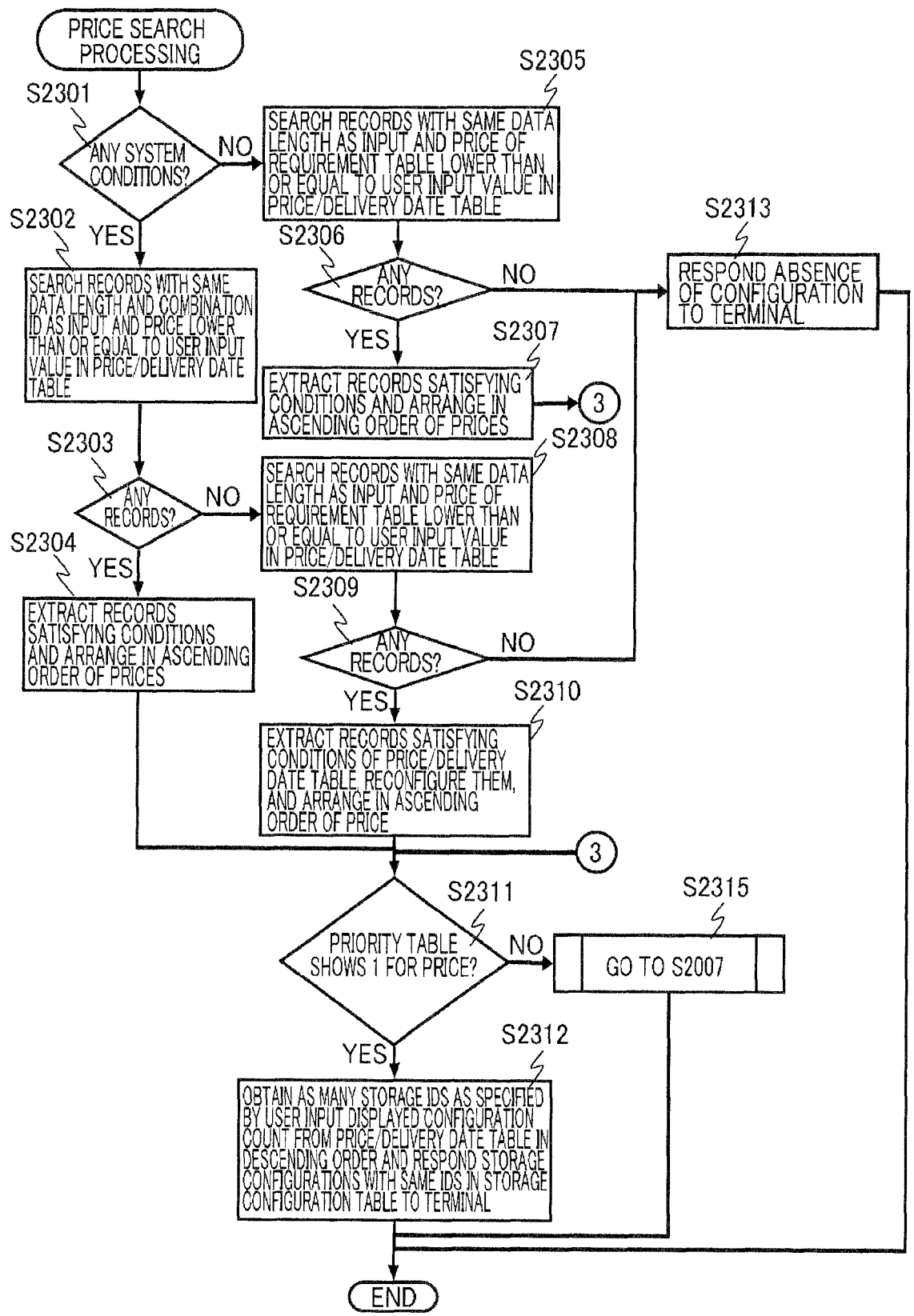
FIG. 23 is a flowchart showing an example of a price search processing performed by the storage configuration management system 1 according to an embodiment of this invention.

Next, the price search processing is described below. FIG. 23 shows an example of the price search processing. The price search processing is performed by the price search unit 1615 of the configuration condition search unit 161 in the configuration creation server 160. As the processing performed from S2301 to S2315 in FIG. 23 is identical to the processing from S2101 to S2115 in FIG. 21 if the "maximum response time" is replaced by the "price" and the "performance table 1300" is "price/delivery date table 1500" referred to by the price search unit 1615, the detailed description is omitted here. Note that, if the priority is determined not to be "1" at S2311 (S2311, No), the price search unit 1615 shifts the processing to the search processing for the next requirement, as more specifically described, to S2007 in the storage requirement search processing in FIG. 20 (S2315).

According to the above-mentioned price search processing, the storage system configuration satisfying the conditions of the price specified by the user can be searched easily.

Delivery Date Search Processing

Figure 24:
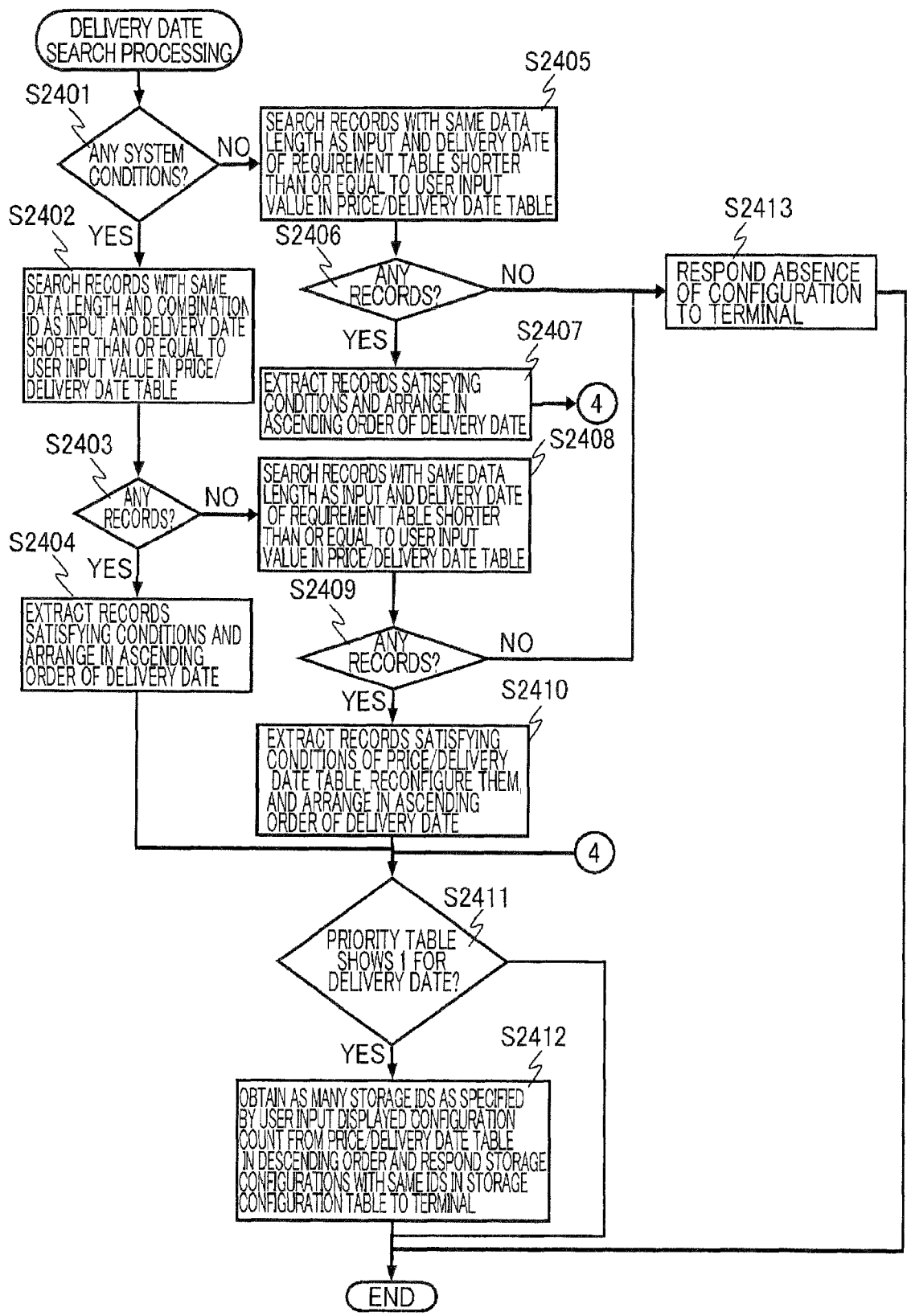
FIG. 24 is a flowchart showing an example of a delivery date search processing performed by the storage configuration management system 1 according to an embodiment of this invention.

Next, the delivery date search processing is described below. FIG. 24 shows an example of the delivery date search processing. The delivery date search processing is performed by the delivery date search unit 1616 of the configuration condition search unit 161 in the configuration creation server 160. As the processing performed from S2401 to S2414 in FIG. 24 is identical to the processing from S2301 to S2314 in FIG. 23 if the "price" is replaced by the "delivery date," the detailed description is omitted here. Note that, if the priority is determined not to be "1" at S2411 (S2411, No), the delivery date search unit 1616 completes the processing.

According to the above-mentioned delivery date search processing, the storage system configuration satisfying the conditions of the delivery date specified by the user can be searched easily.

Configuration Condition Creation Processing

Figure 25A:
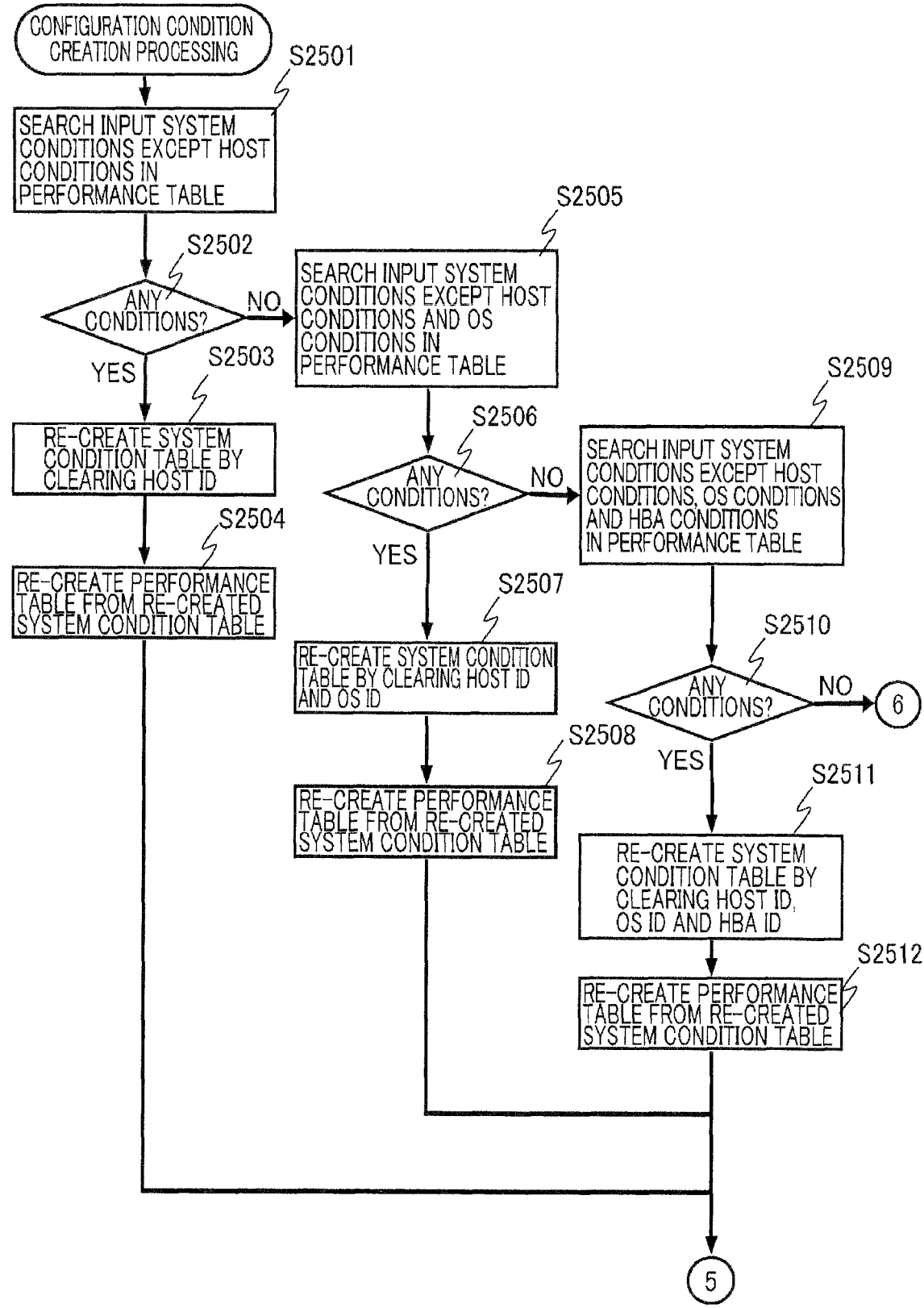
FIG. 25A is a flowchart showing an example of a configuration condition creation processing performed by the storage configuration management system 1 according to an embodiment of this invention.
Figure 25B:
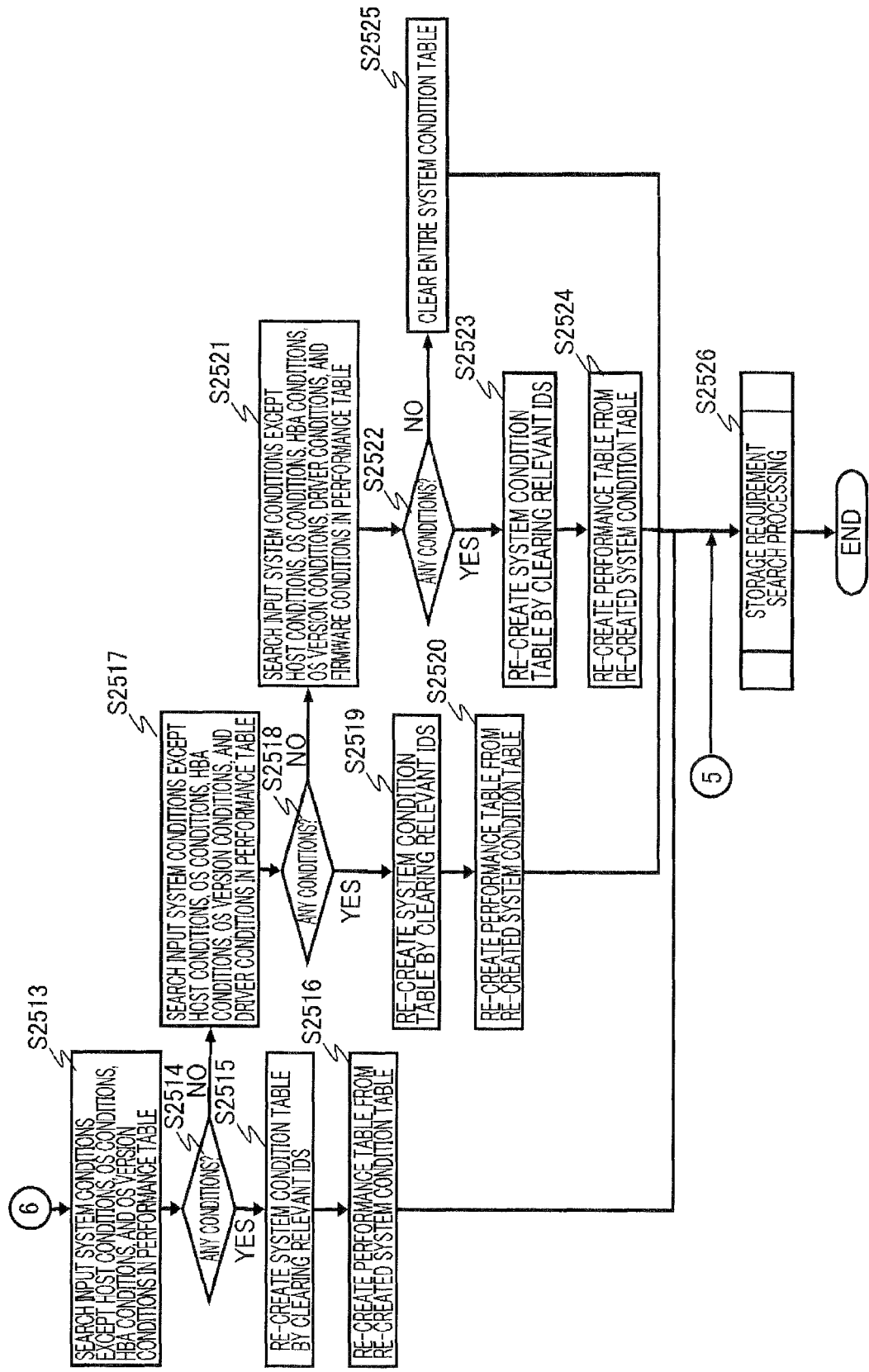
FIG. 25B is a flowchart showing an example of a configuration condition creation processing performed by the storage configuration management system 1 according to an embodiment of this invention.

Next, the configuration condition creation processing performed by the storage configuration management system 1 of this embodiment is described below. FIGS. 25A and 25B show an example of the configuration condition creation processing flow. The configuration condition creation processing is performed by the configuration condition creation unit 162 in the configuration creation server 160. In the above-mentioned configuration condition search processing, if there is no combination ID of the storage system configuration matching the system conditions input by the user from the system condition input screen 800, it is not possible to present the candidates of the relevant storage systems, which is not user-friendly. Therefore, this embodiment intends to improve the convenience by adding the configuration condition creation processing shown at S1904 of FIG. 19.

The configuration condition creation unit 162 refers to the performance table 1300 in the configuration condition storage unit 163, searches the records of the system conditions input by the user except for the host conditions, and determines whether there are any relevant records (S2501, S2502). If the configuration condition creation unit 162 determines that there are (S2502, Yes), the configuration condition creation unit 162 clears the field of the host ID 902 from the system condition table 900 in the configuration condition storage unit 163, and reconfigures the system condition table 900 (S2503). This is the operation for easing the system conditions by deleting one condition from the system conditions specified by the user.

Next, the configuration condition creation unit 162 re-creates the performance table 1300 from the system condition table 900 reconfigured at S2507, and shifts the processing to the storage requirement search processing at S2526 (S2504). As more specifically described, in the system condition table 900, the combination ID 901 is newly issued for each record from which the host ID 902 and the OS ID 903 are cleared, and recorded in the performance table 1300.

If the configuration condition creation unit 162 determines at S2506 that there is no relevant record in the performance table 1300 (S2506, No), the configuration condition creation unit 162 refers to the performance table 1300 in the configuration condition storage unit 163, searches the records of the system conditions input by the user except for the host conditions, the OS conditions, and the HBA conditions, and determines whether there are any relevant records (S2509, S2510). If the configuration condition creation unit 162 determines that there are (S2510, Yes), the configuration condition creation unit 162 clears the fields of the host ID 902, the OS ID 903, and the HBA ID 905 from the system condition table 900 in the configuration condition storage unit 163, and reconfigures the system condition table 900 (S2511).

Next, the configuration condition creation unit 162 re-creates the performance table 1300 from the system condition table 900 reconfigured at S2511, and shifts the processing to the storage requirement search processing at S2526 (S2512). More specifically, in the system condition table 900, the combination ID 901 is newly issued for each record from which the host ID 902, the OS ID 903, and the HBA ID 905 are cleared, and recorded in the performance table 1300.

If the configuration condition creation unit 162 determines at S2510 that there is no relevant record in the performance table 1300 (S2510, No), the configuration condition creation unit 162 refers to the performance table 1300 in the configuration condition storage unit 163, searches the records of the system conditions input by the user except for the host conditions, the OS conditions, the HBA conditions, and the OS version conditions, and determines whether there are any relevant records (S2513, S2514). If the configuration condition creation unit 162 determines that there are (S2514, Yes), the configuration condition creation unit 162 clears the fields of the host ID 902, the OS ID 903, the OS version ID 904, and the HBA ID 905 from the system condition table 900 in the configuration condition storage unit 163, and reconfigures the system condition table 900 (S2515).

Next, the configuration condition creation unit 162 re-creates the performance table 1300 from the system condition table 900 reconfigured at S2511, and shifts the processing to the storage requirement search processing at S2526 (S2516). More specifically, in the system condition table 900, the combination ID 901 is newly issued for each record from which the host ID 902, the OS ID 903, the OS version ID 904, and the HBA ID 905 are cleared, and recorded in the performance table 1300.

If the configuration condition creation unit 162 determines at S2514 that there is no relevant record in the performance table 1300 (S2514, No), the configuration condition creation unit 162 refers to the performance table 1300 in the configuration condition storage unit 163, searches the records of the system conditions input by the user except for the host conditions, the OS conditions, the HBA conditions, the OS version conditions, and the driver conditions, and determines whether there are any relevant records (S2517, S2518). If the configuration condition creation unit 162 determines that there are (S2518, Yes), the configuration condition creation unit 162 clears the fields of the host ID 902, the OS ID 903, the OS version ID 904, the HBA ID 905, and the driver ID 906 from the system condition table 900 in the configuration condition storage unit 163, and reconfigures the system condition table 900 (S2519).

Next, the configuration condition creation unit 162 re-creates the performance table 1300 from the system condition table 900 reconfigured at S2519, and shifts the processing to the storage requirement search processing at S2526 (S2520). More specifically, in the system condition table 900, the combination ID 901 is newly issued for each record from which the host ID 902, the OS ID 903, the OS version ID 904, the HBA ID 905, and the driver ID 906 are cleared, and recorded in the performance table 1300.

If the configuration condition creation unit 162 determines at S2518 that there is no relevant record in the performance table 1300 (S2518, No), the configuration condition creation unit 162 refers to the performance table 1300 in the configuration condition storage unit 163, searches the records of the system conditions input by the user except for the host conditions, the OS conditions, the HBA conditions, the OS version conditions, the driver conditions, and the firmware conditions, and determines whether there are any relevant records (S2521, S2522). If the configuration condition creation unit 162 determines that there are (S2522, Yes), the configuration condition creation unit 162 clears the fields of the host ID 902, the OS ID 903, the OS version ID 904, the HBA ID 905, the driver ID 906, and the firmware ID 908 from the system condition table 900 in the configuration condition storage unit 163, and reconfigures the system condition table 900 (S2523).

Next, the configuration condition creation unit 162 re-creates the performance table 1300 from the system condition table 900 reconfigured at S2523, and shifts the processing to the storage requirement search processing at S2526 (S2524). More specifically, in the system condition table 900, the combination ID 901 is newly issued for each record from which the host ID 902, the OS ID 903, the OS version ID 904, the HBA ID 905, the driver ID 906, and the firmware ID 908 are cleared, and recorded in the performance table 1300.

If the configuration condition creation unit 162 determines at S2522 that there is no relevant record in the performance table 1300 (S2522, No), the configuration condition creation unit 162 refers to the performance table 1300 in the configuration condition storage unit 163, clears all the conditions recorded in the system condition table 900 (S2525), and shifts the processing to the storage requirement search processing at S2526.

According to the above-mentioned configuration condition creation processing, even if there is no storage configuration satisfying the system conditions specified by the user in the configuration condition storage unit 163, the storage systems with the approximate system conditions can be searched step by step by easing the system conditions specified by the user, and it is possible to propose the storage system of the configuration approximate to the user request.

Furthermore, if the search is performed when the user does not specify any storage system, it is also possible to propose the storage system of the configuration satisfying the performance, the price, and the delivery date required by the user.

Storage Configuration Output Screen

Figure 26:
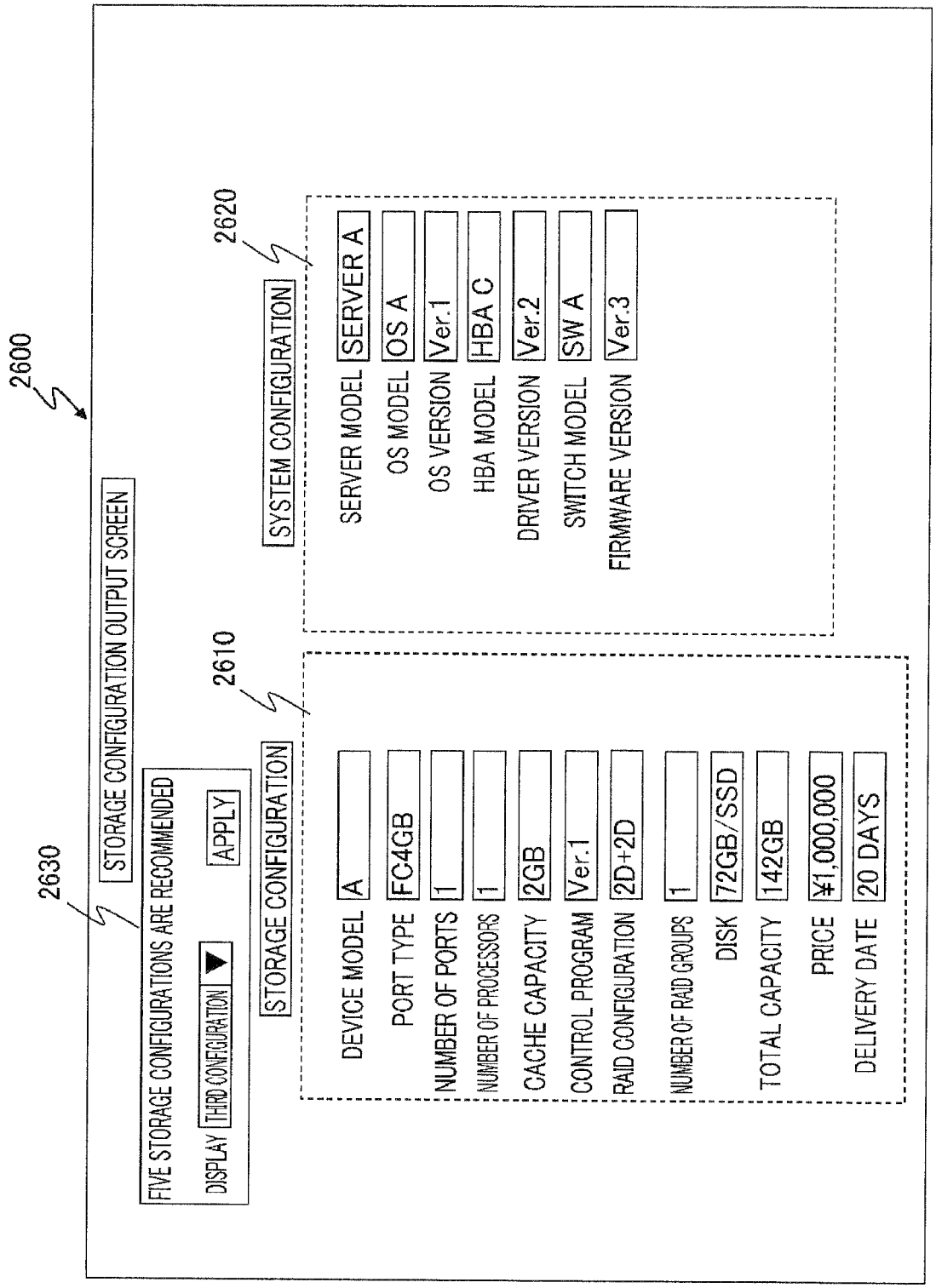
FIG. 26 is a diagram showing an example of a storage configuration output screen 2600.

The storage configuration output screen for presenting the storage configuration extracted by the storage configuration management system 1 through the above-mentioned configuration condition search processing or the configuration condition creation processing is described below. FIG. 26 shows an example of the storage configuration output screen 2600. The storage configuration output screen 2600 is, for example, created as Web data in the configuration condition input/output unit 151 of the user Web server 150, transmitted to the user terminal 140, and presented to the user through the output device 15 of the computer 10 configuring the user terminal 140.

The storage configuration output screen 2600 includes the storage configuration display field 2610, the system configuration display field 2620, and the display item specification field 2630.

The storage configuration display field 2610 displays the storage configuration obtained by the configuration condition search processing or the configuration condition creation processing. The items displayed in the storage configuration display field 2610 are the device model 1002, the port type 1003, the number of ports 1004, the number of processors 1005, the cache capacity 1006, the control program 1007, the RAID configuration 1008, the number of RAID groups 1009, the disk 1010, and the total capacity 1011, which are recorded in the storage configuration table 1100, and the price 1402 and the delivery date 1403 recorded in the price/delivery date table 1500, corresponding to the storage device ID 1401 included in the above-mentioned storage configuration.

The system configuration display field 2620 displays the server model 801, the OS model 802, the OS version 803, the HBA model 804, the driver version 805, the switch model 806, and the firmware version 807, which are stored in the system condition table 900 corresponding to the combination IDs 1202 recorded in the records extracted from the performance table 1300.

The display item specification field 2630 displays the number of storage configurations obtained as a result of performing the configuration condition search processing or the configuration condition creation processing, and which configuration among those to display can be selected from the pull down menu. In the example of FIG. 26, the number of search results is five, and the third one is displayed. As the maximum number which can be displayed in the display item specification field 2630, the number specified by the user through the displayed configuration count 508 of the storage requirement input screen 500 is the upper limit value.

According to the storage configuration output screen 2600 including the above-mentioned configuration, the list of the detailed storage configurations searched and obtained for the conditions input by the user can be ascertained. Furthermore, the user can easily compare and consider a plurality of the proposed storage configurations.

To summarize the above-mentioned description, according to the storage configuration management system according to the embodiments of this invention, it is possible to propose a various types of system configurations including the combinations not actually examined as the storage systems for the conditions including the storage configuration and the storage performance required by the user.

Though this invention has been described with reference to the attached figures in accordance with the embodiments, this invention is not limited to those embodiments, and comprises any changes, modifications or equivalents within the spirit and scope hereof.

The invention claimed is:

1. A configuration management system for a storage system including a host computer, a storage device providing a storage area for data processed by the host computer, and a communication network connecting the host computer and the storage device communicatively, the configuration management system comprising:
a system condition storage unit storing a system condition that includes a combination of components configuring the storage system;
a storage configuration storage unit storing storage configuration information that is a combination of components configuring the storage device;
a performance condition storage unit storing correspondence of the system condition, the storage configuration information given to the storage device included in the storage system with the system condition, and a performance condition indicating a storage performance provided by the storage system,
wherein the performance condition includes a data length of data in one data I/O (input/output) performed in the storage system, a maximum response time for one data I/O, and a minimum number of data I/O performed in a unit of time;
a configuration condition search unit, when a required system condition that is a condition required for the system condition and a required performance condition that is a condition required for the performance condition are input, searching the system condition storage unit using the required system condition and searching the performance condition storage unit using the required performance condition; and
a configuration condition creation unit, if the storage system with the system condition and the performance condition satisfying the required system condition and the required performance condition fails to be extracted by the configuration condition search unit, changing content of the required system condition and searching the system condition storage unit and the performance condition storage unit,
wherein when receiving storage requirement from a user, the configuration condition search unit determines a priority of the maximum response time, and if the priority of the maximum response time is determined to be a predetermined priority value, then the configuration condition search unit performs response time search processing, wherein the response time search processing includes searching the storage system configuration satisfying the conditions of the maximum response time input by a user, wherein if the priority of the maximum response time is not determined to be the predetermined priority value, the configuration condition search unit determines a priority of minimum number of data I/O performed in a unit of time, price information and delivery date information corresponding to the storage configuration information, and if the priority of the minimum number of data I/O performed in a unit of time is determined to be the predetermined priority value, the configuration condition search unit performs minimum number of data I/O performed in a unit of time search processing, price search processing, and delivery date search processing, and wherein the minimum number of data I/O performed in a unit of time search processing, price search processing, and delivery date search processing includes searching the storage system configuration satisfying the conditions of the minimum number of data I/O performed in a unit of time, the price, and the delivery date input by the user.

2. The configuration management system according to claim 1, further comprising:

a price/delivery date storage unit storing the storage configuration information, and the price information and the delivery date information corresponding to the storage configuration information, the price information and delivery date information each indicating a price and a delivery date of the storage device with a configuration specified by the storage configuration information, wherein the system condition includes each piece of information specifying the host computer in the storage system, a communication port provided to the host computer, the communication port facilitating communication with the storage device, and hardware and software used in a switch provided in the communication network, wherein, when a required price condition that is a condition required for the price of the storage device and a required delivery date condition that is a condition required for the delivery date of the storage device are input, the configuration condition search unit searches the price/delivery date storage unit using the required price condition and the required delivery date condition, and determines whether or not the storage configuration information that satisfies the required price condition and the required delivery date condition exists, wherein, when the required performance condition, the required price condition, and the required delivery date condition as input each accompany a priority that is an index indicating which condition should be preceded, the configuration condition search unit searches the performance condition storage unit and the price/delivery date storage unit using the required performance condition, the required price condition, and the required delivery date condition in a predetermined order according to the priorities, wherein, when the configuration condition search unit cannot extract the storage system that accompanies the system condition and the performance condition satisfying the required system condition and the required performance condition, the configuration condition creation unit repeats search of the system condition storage unit and the performance condition storage unit while deleting an item in the required system condition one by one, and wherein, when the system requirement condition is not input, the configuration condition search unit searches the performance condition storage unit using the required performance condition and determines whether or not the storage configuration information that satisfies the required performance condition exists.

3. The configuration management system according to claim 1, further comprising:

a price/delivery date storage unit storing the storage configuration information, and price information and delivery date information corresponding to the storage configuration information, the price information and delivery date information each indicating a price and a delivery date of the storage device with a configuration specified by the storage configuration information, wherein when a required price condition that is a condition required for the price of the storage device and a required delivery date condition that is a condition required for the delivery date of the storage device are input, the configuration condition search unit searches the price/delivery date storage unit using the required price condition and the required delivery date condition, and determines whether or not the storage configuration information that satisfies the required price condition and the required delivery date condition exists.

4. The configuration management system according to claim 3, wherein when the required performance condition, the required price condition, and the required delivery date condition as input each accompany a priority that is an index indicating which condition should be preceded, the configuration condition search unit searches the performance condition storage unit and the price/delivery date storage unit using the required performance condition, the required price condition, and the required delivery date condition in a predetermined order according to the priorities.

5. The configuration management system according to claim 1, wherein when the configuration condition search unit cannot extract the storage system that accompanies the system condition and the performance condition satisfying the required system condition and the required performance condition, the configuration condition creation unit repeats search of the system condition storage unit and the performance condition storage unit while deleting an item in the required system condition one by one.

6. The configuration management system according to claim 1, wherein the system condition includes each piece of information specifying the host computer in the storage system, a communication port provided to the host computer, the communication port facilitating communication with the storage device, and hardware and software used in a switch provided in the communication network.

7. The configuration management system according to claim 1, wherein when the system requirement condition is not input, the configuration condition search unit searches the performance condition storage unit using the performance requirement condition and determines whether or not the storage configuration information that satisfies the performance requirement condition exists.

8. A configuration management method for a storage system including a host computer, a storage device providing a storage area for data processed by the host computer, and a communication network connecting the host computer and the storage device communicatively, the configuration management method comprising:

providing a computer with a system condition storage unit storing a system condition that includes a combination of components configuring the storage system;

a storage configuration storage unit storing storage configuration information that is a combination of components configuring the storage device;

a performance condition storage unit storing correspondence of the system condition, the storage configuration information given to the storage device included in the storage system with the system condition, and a performance condition indicating a storage performance provided by the storage system, wherein the performance condition includes a data length of data in one data I/O (input/output) performed in the storage system, a maximum response time for one data I/O, and a minimum number of data I/O performed in a unit of time;

when a required system condition that is a condition required for the system condition and a required performance condition that is a condition required for the performance condition are input, searching the system condition storage unit using the required system condition and searching the performance condition storage unit using the required performance condition; and if the storage system with the system condition and the performance condition satisfying the required system condition and the required performance condition fails to be extracted by the configuration condition search unit, changing content of the required system condition and searching the system condition storage unit and the performance condition storage unit, wherein when receiving storage requirement from a user, the configuration condition search unit determines a priority of the maximum response time, and if the priority of the maximum response time is determined to be a predetermined priority value, then the configuration condition search unit performs response time search processing, wherein the response time search processing includes searching the storage system configuration satisfying the conditions of the maximum response time input by a user, wherein if the priority the maximum response time is not determined to be the predetermined priority value, the configuration condition search unit determines a priority of minimum number of data I/O performed in a unit of time, price information and deliver date information corresponding to the storage configuration information, and if the priority of the minimum number of data I/O performed in a unit of time is determined to be the predetermined priority value, the configuration condition search unit performs minimum number of data I/O performed in a unit of time search processing, price search processing, and delivery date search processing, and wherein the minimum number of data I/O performed in a unit of time search processing, price search processing, and delivery date search processing includes searching the storage system configuration satisfying the conditions of the minimum number of data I/O performed in a unit of time, the price, and the delivery date input by the user.

9. The configuration management method according to claim 8, further comprising:

providing the computer with a price/delivery date storage unit storing the storage configuration information, and price information and delivery date information corresponding to the storage configuration information, the price information and delivery date information each indicating a price and a delivery date of the storage device with a configuration specified by the storage configuration information; and when a required price condition that is a condition required for the price of the storage device and a required delivery date condition that is a condition required for the delivery date of the storage device are input, searching the price/delivery date storage unit using the required price condition and the required delivery date condition, and determines whether or not the storage configuration information that satisfies the required price condition and the required delivery date condition exists.

10. The configuration management method according to claim 9, further comprising:

when the required performance condition, the required price condition, and the required delivery date condition as input each accompany a priority that is an index indicating which condition should be preceded, searching the performance condition storage unit and the price/delivery date storage unit using the required performance condition, the required price condition, and the required delivery date condition in a predetermined order according to the priorities.

11. The configuration management method according to claim 8, further comprising:

when the configuration condition search unit cannot extract the storage system that accompanies the system condition and the performance condition satisfying the required system condition and the required performance condition, repeating search of the system condition storage unit and the performance condition storage unit while deleting an item in the required system condition one by one.

12. The configuration management method according to claim 8, wherein the system condition includes each piece of information specifying the host computer in the storage system, a communication port provided to the host computer, the communication port facilitating communication with the storage device, and hardware and software used in a switch provided in the communication network.

13. The configuration management method according to claim 8, further comprising:

when the system requirement condition is not input, searching the performance condition storage unit using the performance requirement condition and determines whether or not the storage configuration information that satisfies the performance requirement condition exists.

* * * * *